United States Patent [19]

Aono et al.

[11] Patent Number: 5,049,986

[45] Date of Patent: Sep. 17, 1991

[54] METHOD AND APPARATUS FOR COLOR IMAGE QUANTIZATION

[75] Inventors: Masaki Aono, Tokyo; Kazutoshi Sugimoto, Wakoh, both of Japan

[73] Assignee: International Business Machines Corporation, Armonk, N.Y.

[21] Appl. No.: 427,680

[22] Filed: Oct. 26, 1989

[30] Foreign Application Priority Data

Oct. 27, 1988 [JP] Japan .................................. 63-269514

[51] Int. Cl.$^5$ .............................................. H04N 1/46
[52] U.S. Cl. ...................................... 358/80; 340/703; 364/518
[58] Field of Search .......................... 358/80; 340/703; 364/518, 521

[56] References Cited

U.S. PATENT DOCUMENTS

| | | | |
|---|---|---|---|
| 4,654,720 | 3/1987 | Tozawa | 358/78 X |
| 4,689,669 | 8/1987 | Hoshino et al. | 358/80 |
| 4,694,404 | 9/1987 | Meagher | 364/521 X |
| 4,887,151 | 12/1989 | Wataya | 358/75 X |
| 4,907,075 | 3/1990 | Braudaway | 358/75 |

OTHER PUBLICATIONS

"Uniform Color Scale Applications to Computer Graphics" Computer Vision, Graphics and Image Processing, vol. 22; No. 1, Apr. 1983, J. Tajima.
"Color Image Quantization for Frame Buffer Display"; Computer Graphics, vol. 16, No. 3; Jul. 1982.

*Primary Examiner*—Kenneth A. Wieder
*Assistant Examiner*—Glenn W. Brown
*Attorney, Agent, or Firm*—Perman & Green

[57] ABSTRACT

A high-speed method and an apparatus for color image quantization utilizing an adaptive sampling technique in which the processing time is substantially determined by the number of simultaneously displayed colors to be selected, but is not affected by the number of colors or the color distribution in the original image. Factors contributing to improve the speed of color image quantization are that all calculations necessary for selecting the representative colors can be performed in an integer operation, and there is no need of distance calculation for mapping to neighboring representative colors. All that is required as data are a histogram, a divided color-space management list, and a division priority management list, so that required storage capacity may be small. Accordingly the invention can be implemented on a personal computer.

7 Claims, 25 Drawing Sheets

| ENTRY OF HISTOGRAM | | | FREQUENCY OF USE |
|---|---|---|---|
| r | g | b | H (r, g, b) |
| 0 | 0 | 0 | 0 |
| 0 | 0 | 1 | 5 |
| 0 | 0 | 2 | 123 |
| 0 | 0 | 3 | 2700 |
| 0 | F | F | 4678 |
| F | F | E | 275 |
| F | F | F | 15 |

(m = 4)

| LEVEL IN TREE-STRUCTURE | WEIGHING FACTOR |
|---|---|
| 0 | — |
| 1 | $(5-1)^3 = 64$ |
| 2 | $(5-2)^3 = 27$ |
| 3 | $(5-3)^3 = 8$ |
| 4 | $(5-4)^3 = 1$ |

*1: POINTER TO CORRESPONDING COLOR-SPACE ELEMENT IN THE DIVIDED COLOR-SPACE MANAGEMENT LIST

COLOR LOOKUP TABLE

| COLOR INDEX | COLOR CODE r g b |
|---|---|
| 0 | |
| ⋮ | |
| 2 | 0 F F |
| ⋮ | |
| 11 | 0 0 3 |
| ⋮ | |
| 255 | F F E | k = 256

FIG. 11-A

HISTOGRAM WITH COLOR INDEX

| ENTRY r g b | FREQUENCY OF USE H (r,g,b) | COLOR INDEX |
|---|---|---|
| 0 0 0 | 0 | |
| 0 0 1 | 5 | •1 |
| 0 0 2 | 125 | •1 |
| 0 0 3 | 2700 | 11 (REPRESENTATIVE COLOR) |
| ⋮ | ⋮ | ⋮ |
| 0 F F | 4678 | 2 (REPRESENTATIVE COLOR) |
| ⋮ | ⋮ | ⋮ |
| F F E | 275 | 255 (REPRESENTATIVE COLOR) |
| F F F | 15 | •1 | m = 4

•1: NEIGHBORHOOD REPRESENTATIVE COLOR IS SET IN STEP 3

FIG. 11-B

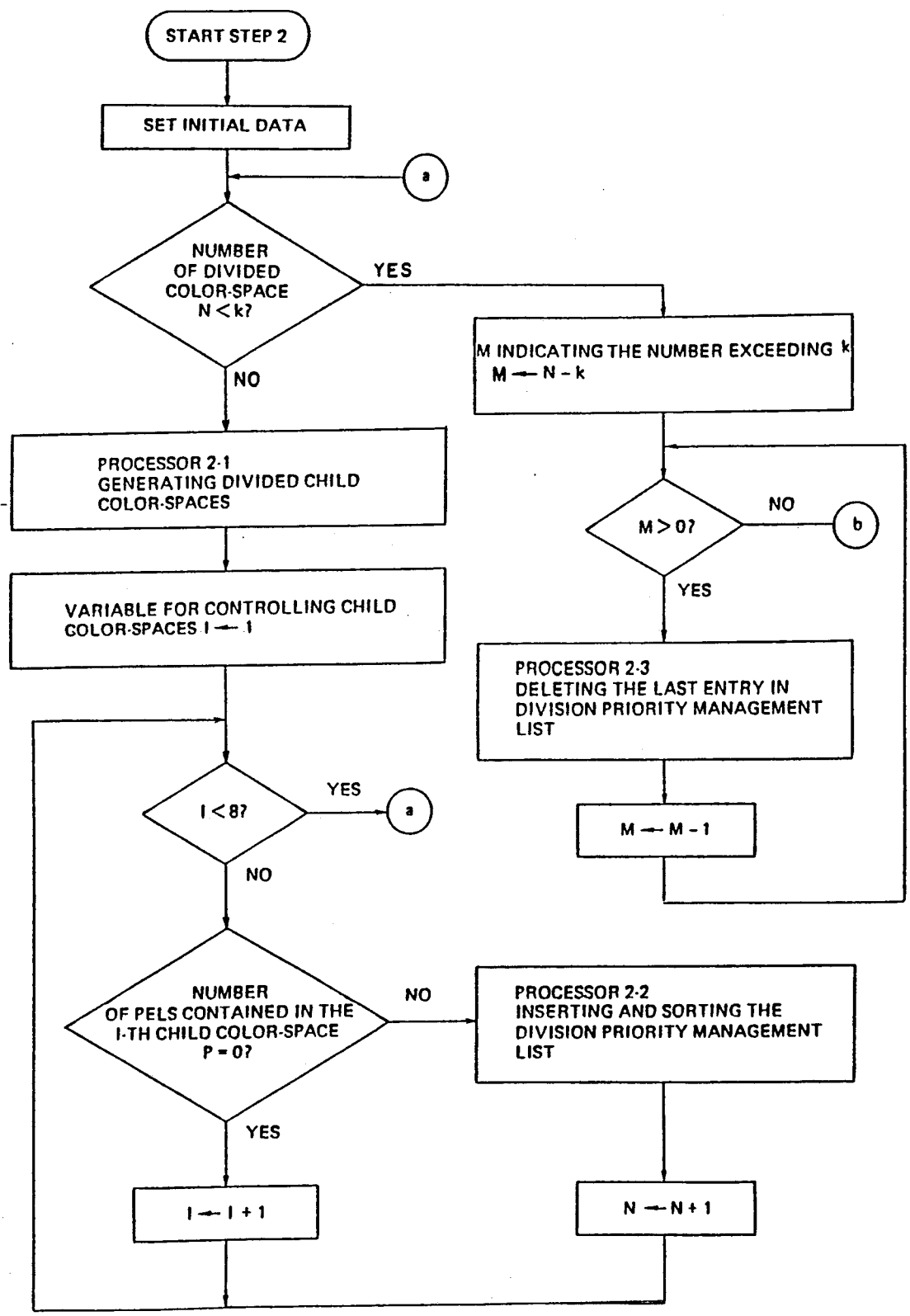
FIG. 13-A

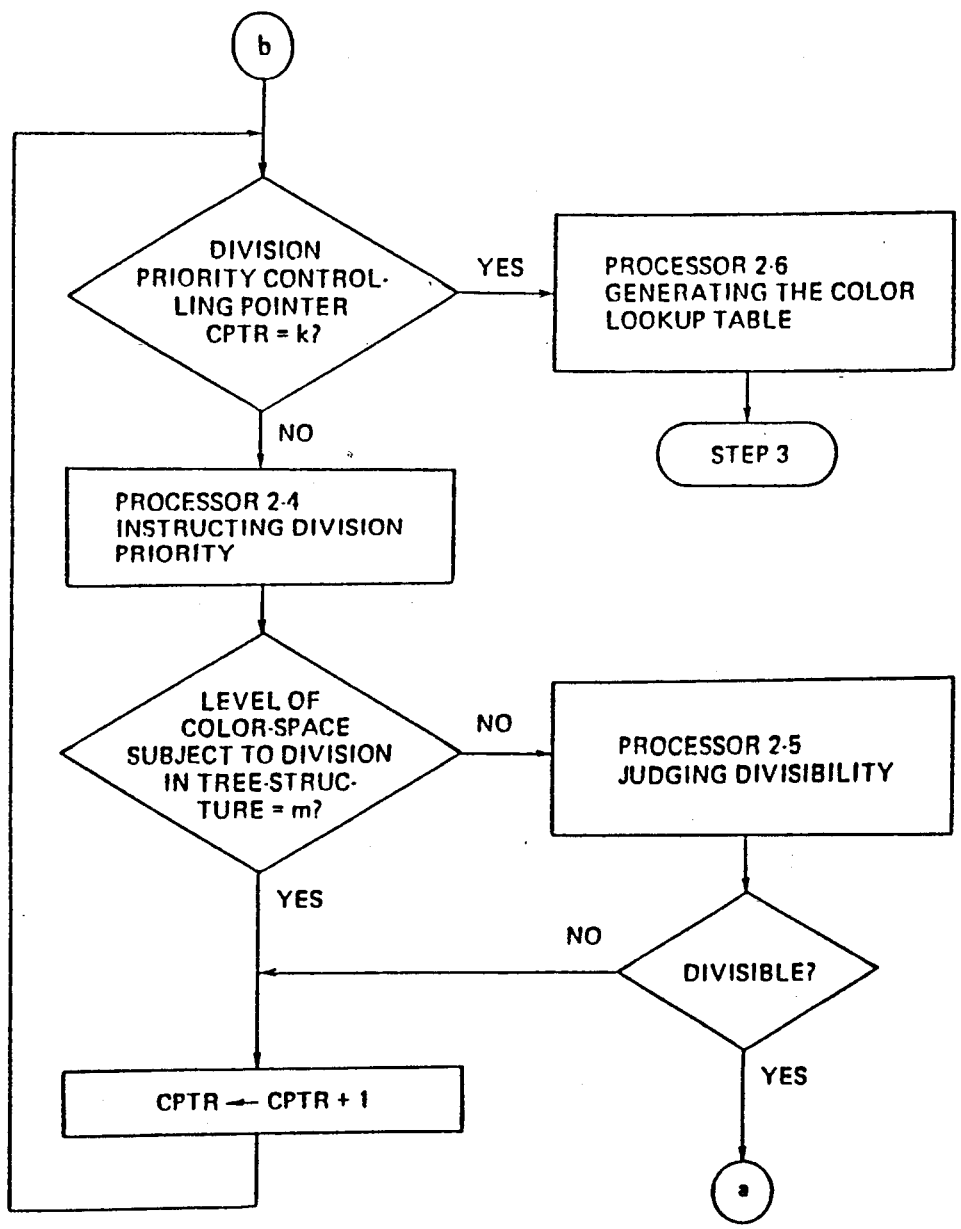
FIG. 13-B

| ENTRY | | | FREQUENCY OF USE |
|---|---|---|---|
| R | G | B | |
| 7 | 10 | 10 | 1 |
| 7 | 12 | 5 | 10 |
| 10 | 2 | 5 | 1 |
| 11 | 0 | 5 | 1 |
| 12 | 1 | 1 | 50 |
| 12 | 7 | 3 | 40 |
| 12 | 7 | 7 | 1 |
| 12 | 8 | 9 | 70 |
| 13 | 7 | 4 | 30 |
| 13 | 10 | 8 | 1 |
| 14 | 4 | 6 | 10 |
| 15 | 1 | 2 | 1 |
| 15 | 2 | 4 | 20 |
| 15 | 5 | 6 | 10 |
| 15 | 9 | 12 | 10 |
| | | TOTAL | 256 |

(LIST ONLY ENTRIES WITH NON-ZERO FREQUENCY OF USE)

FIG. 24

| DIVIDED COLOR-SPACE | Rmin | Rmax | Gmin | Gmax | Bmin | Bmax | TOTAL OF FREQUENCY OF USE |
|---|---|---|---|---|---|---|---|
| ① | 0 | 7 | 0 | 7 | 0 | 7 | 0 |
| ② | 8 | 15 | 0 | 7 | 0 | 7 | 164 |
| ③ | 0 | 7 | 8 | 15 | 0 | 7 | 10 |
| ④ | 8 | 15 | 8 | 15 | 0 | 7 | 0 |
| ⑤ | 0 | 7 | 0 | 7 | 8 | 15 | 0 |
| ⑥ | 8 | 15 | 0 | 7 | 8 | 15 | 0 |
| ⑦ | 0 | 7 | 8 | 15 | 8 | 15 | 1 |
| ⑧ | 8 | 15 | 8 | 15 | 8 | 15 | 81 |

FIG. 25

| DIVIDED COLOR-SPACE | Rmin | Rmax | Gmin | Gmax | Bmin | Bmax | TOTAL OF FREQUENCY OF USE |
|---|---|---|---|---|---|---|---|
| ② — ① | 8 | 11 | 0 | 3 | 0 | 3 | 0 |
| ② — ② | 12 | 15 | 0 | 3 | 0 | 3 | 51 |
| ② — ③ | 8 | 11 | 4 | 7 | 0 | 3 | 0 |
| ② — ④ | 12 | 15 | 4 | 7 | 0 | 3 | 40 |
| ② — ⑤ | 8 | 11 | 0 | 3 | 4 | 7 | 2 |
| ② — ⑥ | 12 | 15 | 0 | 3 | 4 | 7 | 20 |
| ② — ⑦ | 8 | 11 | 4 | 7 | 4 | 7 | 0 |
| ② — ⑧ | 12 | 15 | 4 | 7 | 4 | 7 | 51 |

FIG. 28

NUMBER OF ELEMENT N = 12

NUMBER OF ELEMENT N = 10

NUMBER OF ELEMENT N = 10 ; CPTR = 4

METHOD AND APPARATUS FOR COLOR IMAGE QUANTIZATION

This invention relates to a method and apparatus for color image quantization, and more particularly to an apparatus for quantizing a color image that requires less storage and less processing time to display a color image having a number of colors exceeding the number of colors that can be simultaneously displayed on a color display, without deterioration of the image quality.

BACKGROUND OF THE INVENTION

Recently, a color display employing a color lookup table (LUT) system is being widely used. FIG. 12 shows a schematic of the color LUT system. In the figure, if a frame buffer can store all the intensities of the red, green and blue components of image data, the color LUT becomes unnecessary, and it is sufficient to use the data read from the frame buffer as they are as video signals for the color display. However, if it is assumed that each of the red, the green and the blue components is represented by 8 bits, 24 bits are required for one pel of the image data. The frame buffer requires enormous storage, and becomes expensive.

Thus, it is a recent approach to utilize a color LUT, in which the contents of the frame buffer are used as color indexes, the contents of each of the red, the green and the blue components of the color LUT represented by the color indexes are read and utilized as the video signals for the color display.

Therefore, it is sufficient for the pel data in the frame buffer to just accommodate the number of entries of the color LUT. For example, in a case where the number of entries of the color LUT or the number of colors simultaneously displayed on the color display is 256, the pel data of the frame buffer can be represented by 8 bits (1 byte).

At present, there are color LUT-type displays that can simultaneously display 8, 16, 32 or 256 colors. When it is intended to display on such a color display a color image with colors in a number sufficiently higher than the number of colors simultaneously displayable on the display (for example, a color image, each intensity of the red, the green and the blue component of which is represented by 8 bits, has 16.7 million colors), it becomes important to provide a technique that is able to select the optimum number of simultaneously displayed colors, to cause as little deterioration of image quality as possible, and to map the original colors of the color image to those selected colors simultaneously displayable. The technique is called color image quantization.

As described by P. Heckbert in "Color Image Quantization for Frame Buffer Display," ACM SIGGRAPH '82, pp. 297-307, July, 1982, the color quantization technique is roughly divided into uniform sampling and adaptive sampling. The uniform sampling performs quantization by uniformly dividing a color space, and giving a representative color to each divided space. Its advantage lies in the fact that reloading is not necessary once the representative color for each divided space is loaded in a lookup table. Its disadvantage is that the image quality is significantly degraded for an input image whose colors are not uniformly distributed in a color-space, but are locally clustered. Here, the term color-space means various spaces such as RGB space (Red, Green, Blue space), HLS space (Hue, Lightness, Saturation space), CYMB space (Cyan, Yellow, Magenta, Black space) and L*u*v space.

J. Tajima "Uniform Color Scale Applications to Computer Graphics," COMPUTER VISION, GRAPHICS, AND IMAGE PROCESSING, vol. 21, No. 3, pp. 305-325, March, 1983 discloses the uniform sampling in an L*u*v space. The L*u*v space means a color-space which is arranged so that color difference sensed by a human corresponds to a distance in the space, and is also called a uniform color-space.

On the other hand, the adaptive sampling is a technique to change contents of a lookup table according to an input image and to perform quantization to best represent it. We are interested in a color image quantization method according to the adaptive sampling. Various adaptive sampling methods have been proposed. All of them perform quantization in the following four steps. Here we assume that an input image is defined in an RGB space without losing generality.

Step 1: Sample an input image represented by each n bits for each of R, G, and B in a space with each "m" bits for each of R, G, and B (generally m=n), and generate a histogram.

Step 2: Select colors to be loaded in the lookup table ("k" colors) (generally, $2^{3m}-=k$).

Step 3: Perform mapping from the sampled "m" bit RGB space to the lookup table.

Step 4: Assign corresponding color in the lookup table to each pel of the input image.

Among these steps, Step 2 and subsequent steps determine the image quality, but key steps for the quantization itself are Steps 2 and 3. That is, the quality of the quantization depends on Step 2 where the "k" representative colors are selected, and Step 3 where colors "close" to remaining colors are selected from the "k" representative colors, and assigned. In Step 4, the error diffusion method utilizing errors of the quantization or the dither method (random noise method) is also used in many cases.

Known technique for Step 2 is listed in the following. First, P. Heckbert "Color Image Quantization for Frame Buffer Display," ACM SIGGRAPH, July, 1982 discloses the popularity algorithm and the median cut algorithm. The former is a method that sorts the histogram in a descending order of frequency, and selects "k" colors from the top as the representative colors. This method is simple, but has a noticeable disadvantage that the image quality significantly deteriorates if many colors are distributed with the equal frequency.

On the other hand, the latter is a method that calculates the maximum and the minimum values in each direction of R, G, and B components, and splits the space with their median value recursively. Extra time is necessary to find the maximum and the minimum values in each direction of R, G, and B components, and, if the median values are given in real numbers, much processing time is required because of real number calculation. If they are given in integers, it has a disadvantage that errors may be caused whether they are truncated or rounded.

Y. Tozawa discloses the population equalization algorithm in the U.S. Pat. No. 4,654,720. It is a method that selects "k" representative colors while finding neighborhood spaces which render the frequency of the "k" colors becomes as equal as possible in the color-space. This method provides excellent image quality, but has a disadvantage in that much time is necessary to merge the neighborhood spaces depending on the input image, and that enormous work areas (storage) are required.

S. Iwai and S. Uno disclose the fixed area +chromaticity based algorithm in the U.S. Pat. No. 4,710,806. It is a method in which a fixed area is provided in a color lookup table in advance, entries whose values appear in the fixed area are removed from the histogram before a histogram is generated based on the ratio between R, G, and B (chromaticity), and representative colors are found according to peak values appearing therein. It features the fact that colors in a region with constant chromaticity and varying lightness are mainly selected by utilizing the characteristic of the human eye that is sensitive to the lightness. Existence or nonexistence of the fixed area depends on an input image, so that it may be an advantage or a disadvantage. However, it has a disadvantage in that it requires much processing time because real number calculation is involved in a series of processes such as generation of the histogram for brightness and detection of the peaks (particularly, calculation of angles such as arc cosine).

On the other hand, as for Step 3, it is necessary to find neighborhood representative color for those remaining colors with more than one entry in the histogram. Y. Tozawa's technique processes them through merge while incrementing the distance as 1-st neighborhood, 2-nd neighborhood, and so on. Other approaches are arranged to find representative colors in neighborhood by introducing some measure of distance (for example, Euclidean distance in the RGB space). The distance calculation for finding the neighborhood is a time-consuming process.

According to the present invention means are provided for processing both Steps 2 and 3 in the adaptive sampling method at a high speed. The processing time and the storage required for quantization by this means are only proportional to the number of colors simultaneously displayable on the color display, and are not affected by the number of colors and the distribution of colors specific to the original image. It can work even on a personal computer because less storage is required for implementing the means.

The method and apparatus for color image quantization according to the invention execute the following steps to select "k" display colors from the $2^{\epsilon ni}$ colors obtained by assigning $n_i$ bits for representing the intensity level of each of "a" kinds of basic color $1 \leq i \leq a$), and to quantize an original color image comprising a number of pels for which any one of the said $2^{\epsilon ni}$ colors may be assigned so that it may be displayed with the said "k" display colors:

(a) Inputting the said original image, sampling it in a color-space defined by assigning $m_i$ ($m_i \leq n_i$) bits for representing intensity level of each of the said "a" kinds of basic color, and generating an a-dimension histogram, (b) Repeating dividing a color-space into X child-spaces, when calculating a space-occupying number by: calculating the number of pels assigned for colors within each generated child-space, referring to the said histogram,
and multiplying the calculation result by a weighing-factor corresponding to a level of the division, (c) Preparing a tree-structured list which describes a parent-child relationship of color-spaces, and updating the list by registering a newly generated color space each time a color space is divided, (d) Selecting "k" color spaces as representative color spaces in the descending order of the space-occupying number, among those located at ends of the tree-structured list, (e) Selecting a representative color for each of the said "k" representative color-spaces, and providing the representative color with an index, (f) For a color other than the representative color within each of the said "k" representative color-spaces, giving the index assigned for the representative color of the color-space, for a color within a color-space other than the said representative color-spaces in the said tree-structured list, finding a representative color-space located close to the color-space, and giving it the index assigned for the found representative color-space, and (g) For each pel in the said original image, obtaining an index given to the color assigned for the pel, and storing it in storage device.

The above-mentioned "a" kinds of basic color are typically those basic colors such as red, green and blue. However, the scope of the invention is not limited to an image consisting of only color components. For example, in the field of remote sensing, a component such as ground surface temperature may be included in the basic component. In this regard, an image to be quantized according to the invention can be called a multi-dimensional multi-value image in a precise manner. However, in the following, the term "color image" is used for convenience.

SUMMARY OF THE INVENTION

This invention provides a high-speed method and an apparatus for color image quantization utilizing the adaptive sampling technique in which the processing time is substantially determined by the number of simultaneously displayed colors to be selected, but is not affected by the number of colors or the color distribution in the original image.

Factors contributing to improve the speed of color image quantization are that all calculations necessary for selecting the representative colors can be performed in the integer operation, and that there is no need of distance calculation for mapping to neighboring representative colors.

All that is required as data are a histogram, a divided color-space management list, and a division priority management list, so that required storage capacity may be small. Accordingly the invention can be implemented on a personal computer.

In addition, it is arranged that the divisibility of a color-space can be determined by introducing a weighing-factor which depends on the division level, so that, in a case where the original image does not have coloring that is not uniformly distributed in the color-space, but has a number of local peaks, it is possible to avoid dropping of the colors representing a color group that are of low density in the color-space, but are widely distributed (they are often colors for accent). Therefore, it is possible to prevent degrading of the quality of the quantized image.

BRIEF DESCRIPTION OF THE DRAWINGS

FIGS. 11A and 11B are diagrams illustrating a color-indexed histogram and a color lookup table.

FIG. 13 and 13B are diagrams illustrating the process flow of Step 2 in detail.

FIG. 24 is a diagram illustrating an example of the histogram.

FIGS. 25 and 28 are diagrams illustrating examples of data for divided color-spaces after division into eight.

BEST MODE OF CARRYING OUT THE INVENTION

Although the invention can apply to a multi-dimensional multi-value image, it is described as an apparatus for simple color image quantization by exemplifying a color-space consisting of red, green and blue components.

Figure 1:
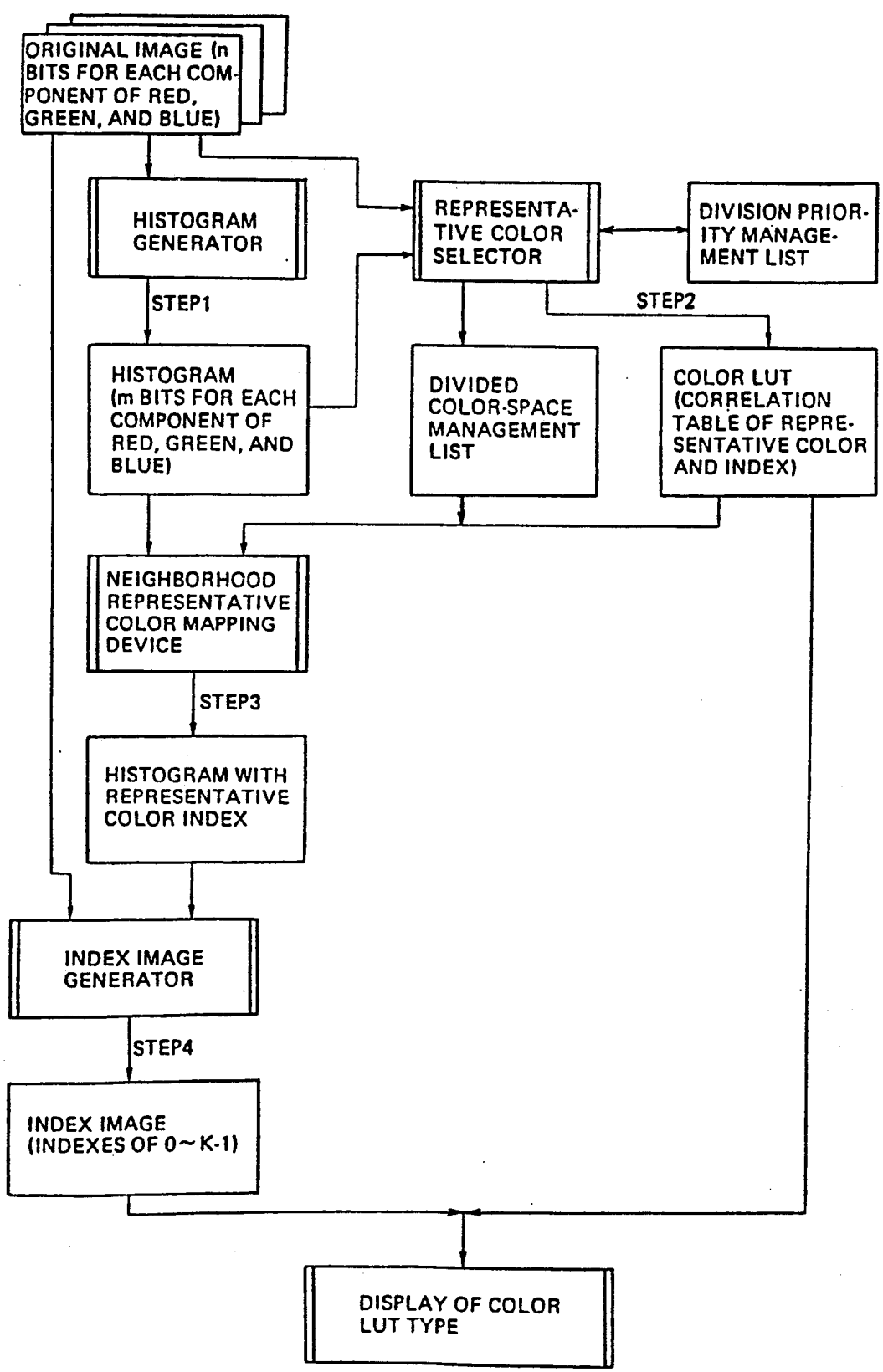
FIG. 1 is a diagram schematically showing the entire constitution of an embodiment according to the invention.

FIG. 1 shows a schematic of the apparatus for color image quantization according to the invention. The apparatus roughly consists of four units, that is, a histogram generator, a representative color selector, a neighborhood representative color mapping device, and an index image generator. Here, it is assumed that each of the red, the green and the blue components of an original image to be displayed is "n" bits, and that a display of the color LUT technique selects and displays "k" colors (hereinafter called "representative colors") from a color-space consisting of "m" bits for each of the red, the green, and the blue components. The apparatus performs quantization of a color image through the following four major steps. The following describes the processing sequence in conjunction with each of the above units.

1) Step 1: Generation of histogram

Figures 2, 6, 7:
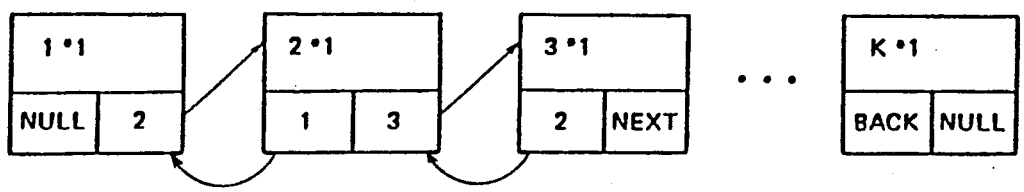
FIG. 2 is a diagram illustrating a histogram created by Step 1.
FIG. 6 is a diagram illustrating a weighing-factor for finding a space-occupying number.
FIG. 7 is a conceptual diagram of a division priority management list.
Figure 3:
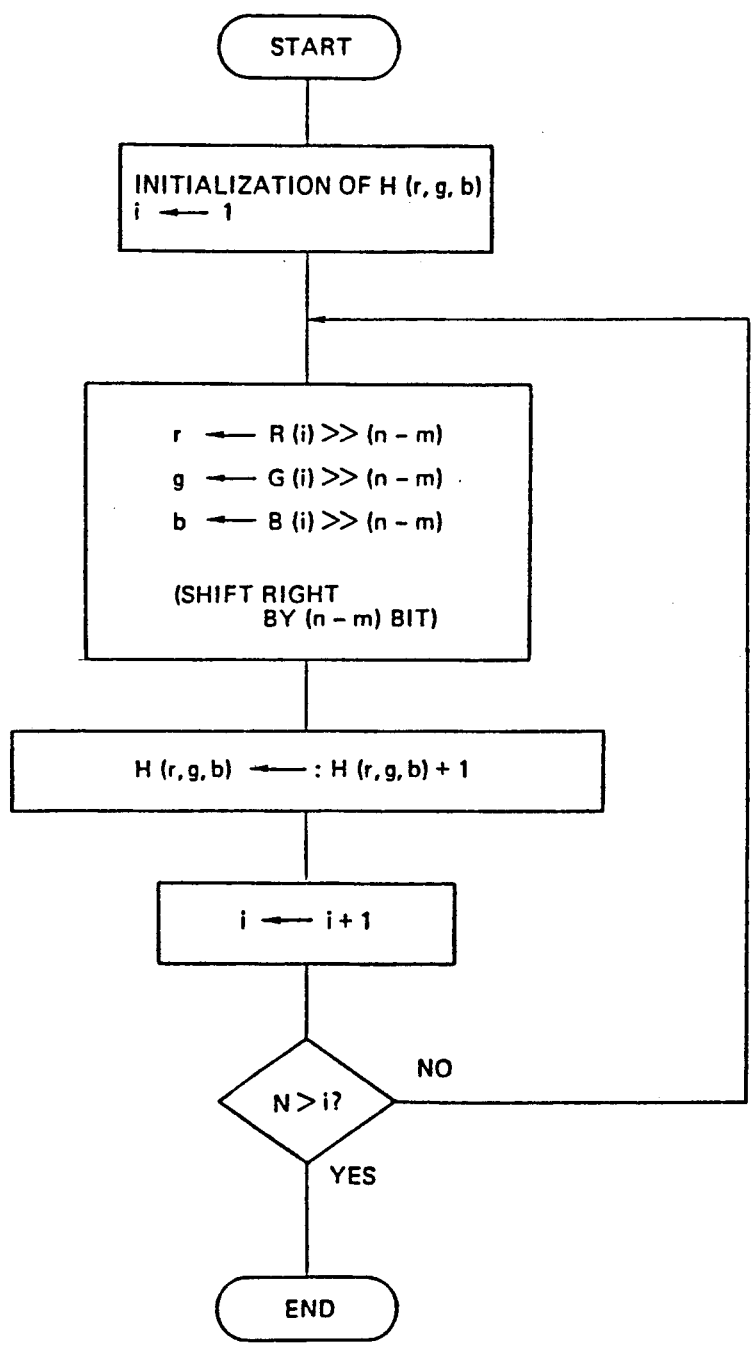
FIG. 3 is a flowchart for generating the histogram in Step 1.

The histogram generator receives an original image to be displayed, finds the frequency of colors used in the image, and outputs a histogram. The original image being received is represented by "n" bits for each of the red (R), the green (G), and the blue (B) components, and the histogram being outputted has "m" bits for each of R, G, and B ($n \geq m$). FIG. 2 shows an example of histograms, and FIG. 3 shows the processing sequence of the histogram generator. In FIG. 3, N indicates the number of pels in the original image, R(i), G(i) and B(i) indicate the i-th pel data of the original image ("n" bits for each of R, G and B), respectively, r, g, and b indicate data consisting of only significant "m" bits taken from data of R(i), G(i) and B(i), respectively, and H (r, g, b) indicates the frequency of use (count value) for elements (r, g, b) in a color-space represented by "m" bits for each of the red, the green, and the blue components. Once Step 1 is completed, Step 2 is started.

2) Step 2: Selection of representative colors

In Step 2, the representative color selector recursively divides into eight the color-space represented by "m" bits for each of the red, the green, and the blue components, and finally obtains "k" divided color-spaces spaces from which the representative colors are selected. In this case, the color-space is recursively divided into eight so that the number of pels (frequency of use) assigned in each divided color-spaces may become as nearly equal as possible.

A divided color-space management list and a division priority management list are introduced as an approach to implement the above. Before explanation is made of the sequence to select the representative colors, the divided color-space management list and the division priority management list are briefly explained. Both lists are generated in the storage.

2-1) Divided color-space management list

Because the embodiment herein treats a three-dimensional space having the red, the green, and the blue components, the space is divided into eight, and the divided color-space management list has an eight-branch (oct-tree) structure. The list will be a four-branch (quad-tree) structure if the space is two-dimensional, or a 16-branch structure if it is four-dimensional.

Figure 4:
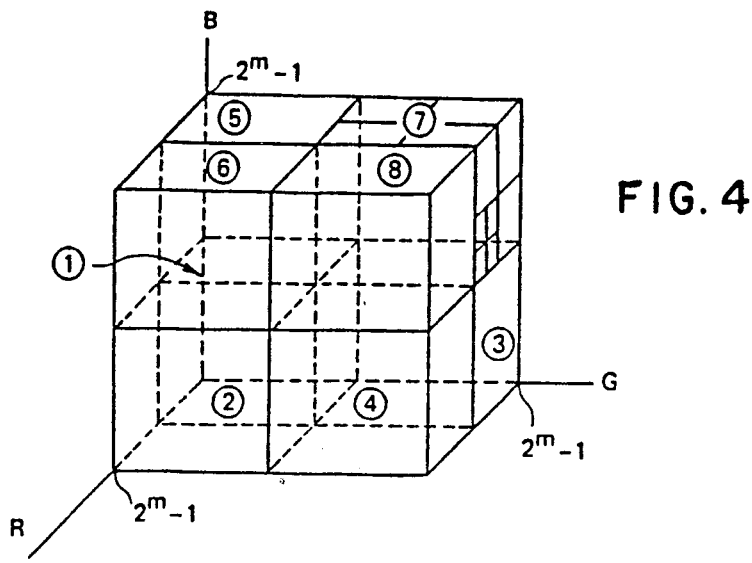
FIG. 4 is a diagram illustrating the relation between the RGB space and the divided color-spaces.

FIG. 4 shows the relation between the color-space and eight divided spaces. At the time when the color image quantization process is started, each of the red, the green, and the blue components has a value in a range from the lower limit of 0 to the upper limit of $2^m - 1$. First, the entire color-space is divided into eight. For the sake of convenience, the eight divided spaces are numbered from (1) to (8) according to the numbering practice as shown in FIG. 4. They are called child color-spaces (child-octants) to the original color-space. On the contrary, the original space is called a parent color-space (parent-octant) to those child color-spaces (1) to (8).

Now, if the lower and the upper limits of the red, the green, and the blue components of a parent color-space are represented by $(R_{min}, R_{max})$, $(G_{min}, G_{max})$, and $(B_{min}, B_{max})$, those of the child color spaces are automatically defined according to the following rule.

Figure 5:
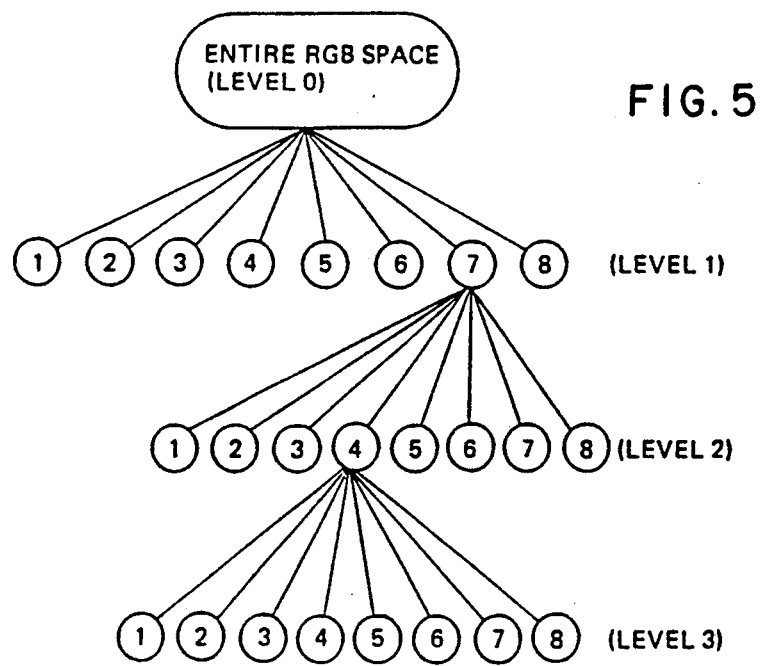
FIG. 5 is a conceptual diagram of a divided color-space management list.

Child-octant (1)
$(R_{min}, (R_{min} + R_{max})/2)$, $(G_{min}, (G_{min} + G_{max})/2)$, $(B_{min}, (B_{min} + B_{max})/2)$
Child-octant (2)
$((R_{min} + R_{max})/2, R_{max})$, $(G_{min}, (G_{min} + G_{max})/2)$, $(B_{min}, (B_{min} + B_{max})/2)$
Child-octant (3)
$(R_{min}, (R_{min} + R_{max})/2)$, $((G_{min} + G_{max})/2, G_{max})$, $(B_{min}, (B_{min} + B_{max})/2)$
Child-octant (4)
$((R_{min} + R_{max})/2, R_{max})$, $((G_{min} + G_{max})/2, G_{max})$, $(B_{min}, (B_{min} + B_{max})/2)$
Child-octant (5)
$(R_{min}, (R_{min} + R_{max})/2)$, $(G_{min}, (G_{min} + G_{max})/2)$, $((B_{min} + B_{max})/2, B_{max})$
Child-octant (6)
$((R_{min} + R_{max})/2, R_{max})$, $(G_{min}, (G_{min} + G_{max})/2)$, $((B_{min} + B_{max})/2, B_{max})$
Child-octant (7)
$(R_{min}, (R_{min} + R_{max})/2)$, $((G_{min} + G_{max})/2, G_{max})$, $((B_{min} + B_{max})/2, B_{max})$
Child-octant (8)
$((R_{min} + R_{max})/2, R_{max})$, $(G_{min} + G_{max})/2, G_{max})$, $((B_{min} + B_{max})/2, B_{max})$ Each child color-space is further subject to division into eight. As division is repeated, the difference between the lower and the upper limits becomes smaller. Thus, a tree structure as a whole as shown in FIG. 5 is obtained. It is the divided color-space management list that controls this tree structure.

Each element (node) in the divided color-space management list (node) has the following information for controlling each child color-space:

(1) Depth of the tree structure (level)
(2) Upper and lower limits of the red, the green, and the blue components of a child color-space
(3) Space-occupying number
(4) Color index of a color lookup table (LUT)
(5) Representative color (red, green, and blue)
(6) Pointer to the parent color-space
(7) Pointers to eight child color-spaces The level in the tree structure (1) has a value of up to "m" at the deepest level. At the level "m," the upper limit coincides with the lower limit. This means that the space cannot be divided any more at the level "m." The space-occupying number (3) can be found by multiplying the the frequency of use in the histogram found in Step 1 by a weighing-factor determined according to the depth of the tree structure (level) (1). FIG. 6 shows an example of weighing-factor rules for m=4. The color index of a color LUT (4) and the representative color (5) are set in Step 2 or 3. The pointers (6) and (7) are pointers connecting the parent color-space and the child color-space according to the numbering rules shown in FIG. 4 when the parent color-space is divided into eight child color-spaces, and back pointers enabling easy reference from a child color space generated through division to the parent color space. In a case where a color space does not have any child color space, all the pointers of (7) are empty (NULL). Also, in a case where the space-occupying number becomes zero, the color space is not assigned for a memory for its control, and is treated as an empty (NULL) space. Therefore, some of the pointers to child color-spaces may be empty (NULL).

2-2) Division priority management list

The division priority management list is used to determine which space should be divided into eight next, while a color-space is recursively divided into eight.

Figure 8:
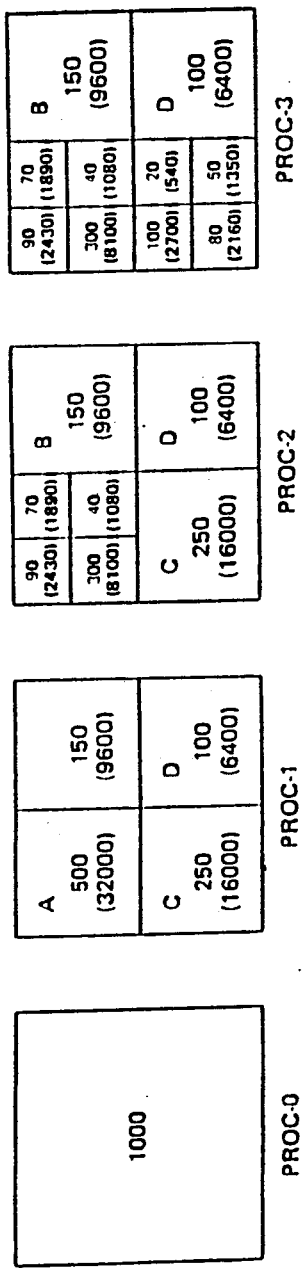
FIG. 8 is a diagram two-dimensionally illustrating the process for dividing a color-space.

FIG. 7 shows a division priority management list. Each element of the list is rearranged in the descending order of the space-occupying number whenever a color-space is divided into eight. Thus, each element (node) of the list has the following three pointers:

(1) Pointer to a corresponding color-space element (node) in the divided color-space management list
(2) Pointer to an element (node) that has a space--occupying number smaller than its space-occupying nubmer, but is closest to it
(3) Pointer to an element (node) that has a space--occupying number larger than its space-occupying number, but is closest to it 2-3) Procedure for selecting representative colors FIG. 8 shows the process in which a color-space is divided two-dimensionally for easy understanding. The numerals in the divided color-space of FIG. 8 indicate examples of the space-occupying number.

Figure 9:
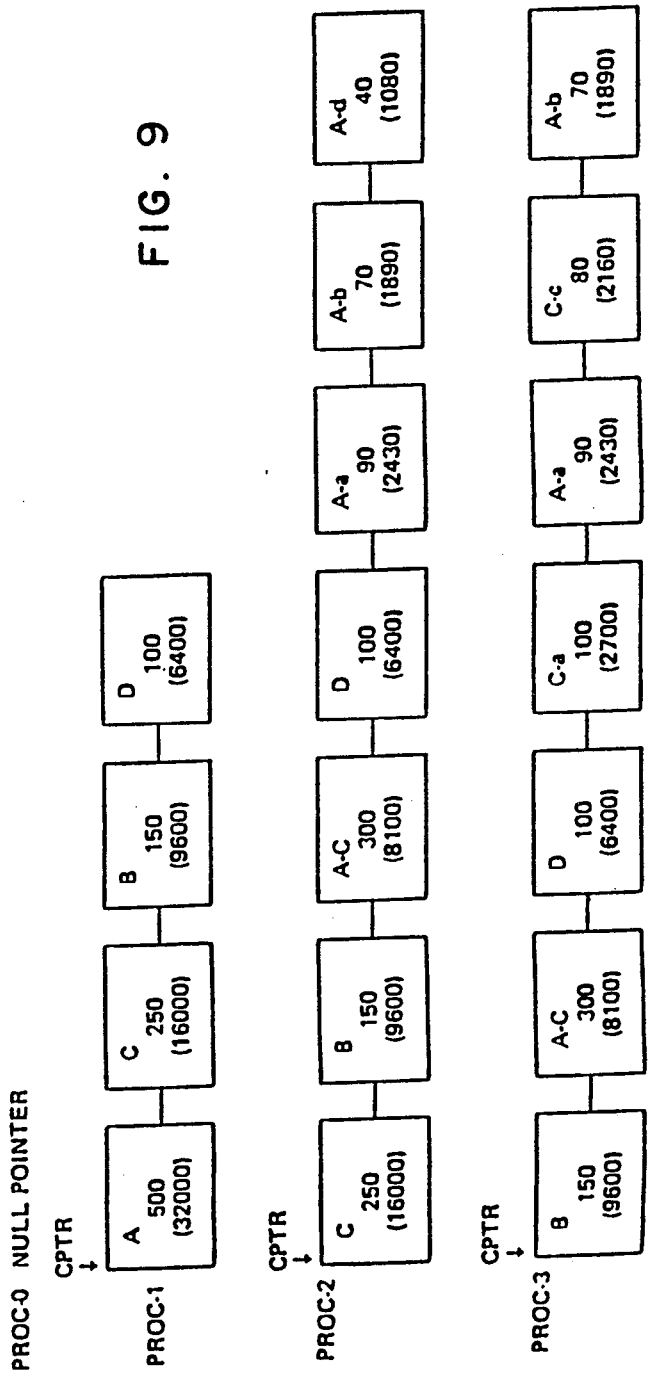
FIGS. 9 and 10 are diagrams illustrating the process for generating the division priority management list.

First, a color-space is divided into four, and provides four child-color spaces. At the time, the above-mentioned divided color-space management list as well as the division priority management list are generated, so that the elements are arranged in the descending order of the space-occupying number (proc-1 in FIGS. 8 and 9).

Then, a child-space (A) at the top of the division priority management list pointed by the division priority controlling pointer (CPTR), or having the largest space-occupying number is selected as the object of division, and divided into four. The divided color-space management list is updated in the same manner as above, and the division priority management list is rearranged and updated for its elements in the descending order of the space-occupying number (proc-2 in FIGS. 8 and 9). Such a process of division into four is recursively repeated until the number of divided color-spaces reaches "k" (the number of representative colors).

In a case where "k" is a very large number, the division of a color-space may be stopped at the moment when the number of color-spaces registered in the division priority management list reaches "k," and to start Steps 3 and 4.

However, to attain further improvement of the image quality, division of the color-space, and update of the divided color-space management list and the division priority management list are further repeated herein.

Figure 10:
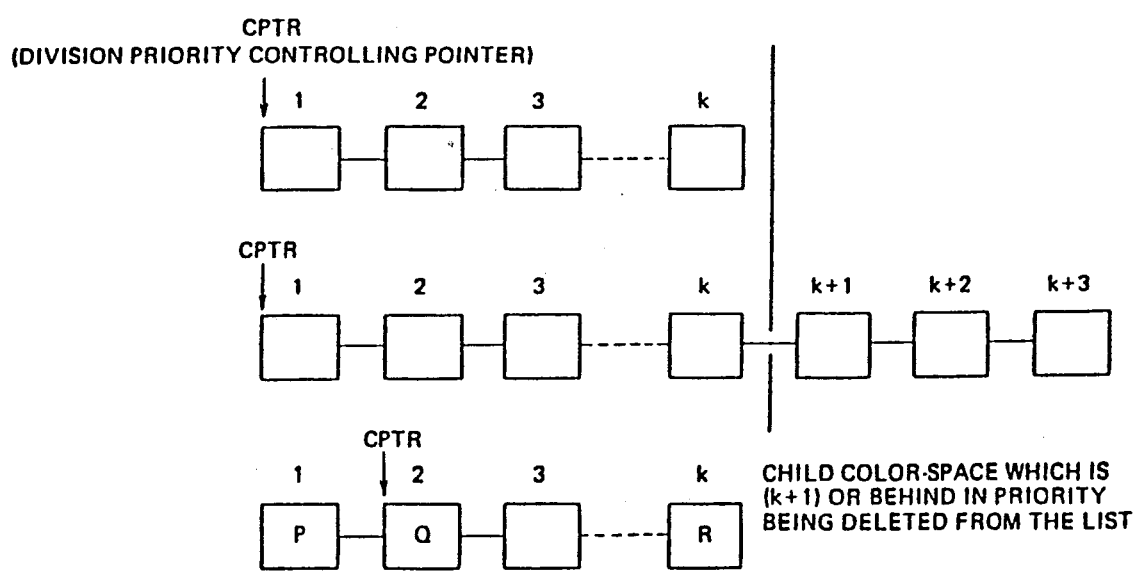
Figure 12:
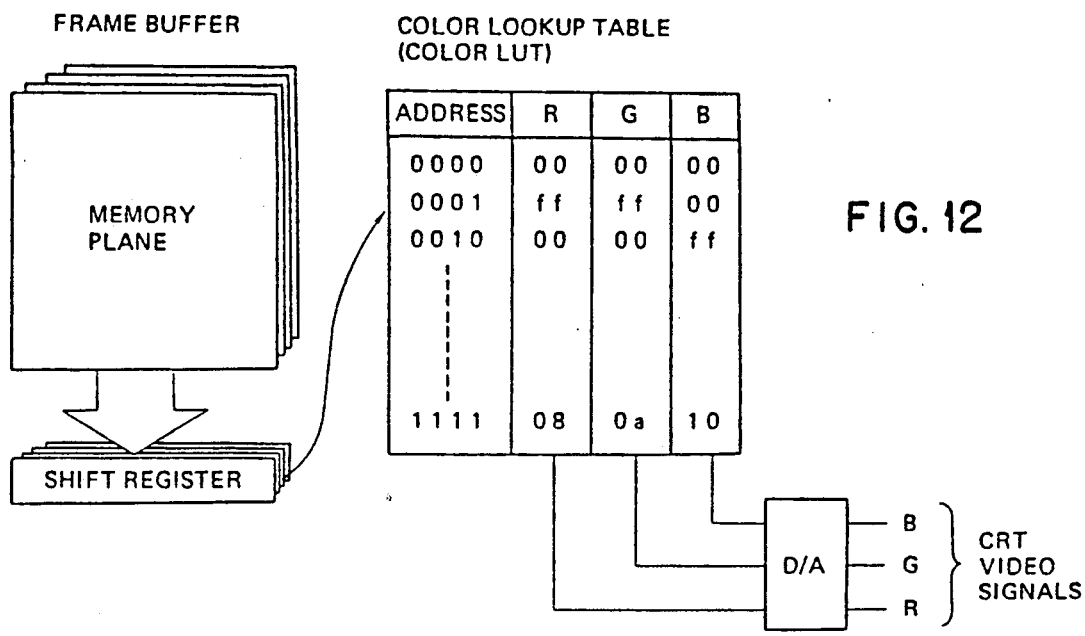
FIG. 12 is a diagram schematically illustrating a color display using the color LUT technique.

When the number of the divided color-spaces becomes larger than "k," as shown in FIG. 10, a color-space which is (k+1) or behind in priority is deleted from the division priority management list.

In addition, after the number of the divided color-spaces becomes larger than "k," a child color-space to be divided is selected in the following manner. First, assuming that a child color-space at the top of the division priority management list pointed by CPTR (P in FIG. 10) is divided into four, if the largest value of the space-occupying numbers for these four child color-spaces is larger than than that of the space-occupying number for a child color-space (R) at the end of the current division priority management list, the color-space (P) at the top of the division priority management list is divided into four. Otherwise, CPTR moves to the second child color-space (Q), which is then selected as the object of division and divided into four. The same process is repeated, and the process of Step 2 is completed when CPTR points to the k-th child color-space R.

The representative color selector determines representative colors from colors contained in "k" child color-spaces in the final division priority management list generated in Step 2, and sets color indexes of the representative colors to corresponding "k" child color-spaces in the divided color-space management list. It also generates a color lookup table (LUT) that is a correlation table of the representative colors and the color indexes (see FIG. 11A). The color indexes are also set in the corresponding entries in the histogram.

Step 3: Mapping to neighborhood representative color

The neighborhood representative color mapping device determines representative colors closest to those of the original image, and sets indexes of the representative colors in the histogram generated in Step 1 (see FIG. 11B). Step 3 consists of the following two major processes.

3-1) Process 1

To a non-end parent color-space in the generated divided color-space management list having child pointers, the color index of the child color space having largest space-occupying number among those with representative colors is recursively set as its color index.

3-2) Process 2

Neighborhood representative colors for mapping are determined in the following manner for entries of the histogram generated in Step 1 whose use frequency is non-zero, and which are not selected as the representative colors.

a) If any brother color-space, which means color-spaces having the same parent color space, is selected as a representative color, its color index is provided.

b) If there is no such color space, the color index of the representative color of the parent color-space set in Process 1 is provided.

c) Thus, each node in the divided color-space management list, or each color-space is provided with one color index. Then, it is sufficient to find an end node, to which the color of the entry with non-zero frequency of use in the histogram belongs, by traversing the divided color-space management list for each entry, and to set the index provided for the node to the entry.

4) Step 4: Index image generation

The index image generator replaces color of each pel of the original image to an index of the representative color by referring to the histogram with indexes of the representative colors generated in Step 3 to generate an index image in which a pel sequence is represented by an index sequence.

II. More detailed embodiment

Now, a detailed explanation of the representative color selector in Step 2 of the above-mentioned embodiment, and the neighborhood representative color mapping device in Step 3, is given. It should be noted that the processor being described in the following may be constituted by dedicated hardware, or by a software routine.

1) Step 2: Selection of representative colors

FIG. 13 shows a more detailed process flow of the representative color selector. It has six processors. Input signals, output signals and processing procedure of each processor are described below.

(1) Processor 2-1 (processor for generating a divided child color-space)

The processor 2-1 receives the divided color-space data to be divided and the histogram as input signals, and outputs child color-space data as output signals. The contents of the input and the output signals are provided as follows:

(Input signals): The divided color-space to be divided being represented by $\theta_{in}$ (1) Level of $\theta_{in}$ (integer data)
(2) $R_{min}$, $R_{max}$ of $\theta_{in}$ (integer data)
(3) $G_{min}$, $G_{max}$ of $\theta_{in}$ (integer data)
(4) $B_{min}$, $B_{max}$ of $\theta_{in}$ (integer data)
(5) Three-dimensional histogram H (r, g, b) (integer data)

(Output signals): j-th child color-space ($1 \leq j \leq 8$) being represented by $\theta_{out}(j)$ The following is outputted for j=1 to 8.
(1) Level of $\theta_{out}(j)$
(2) $R_{min}$, $R_{max}$ of $\theta_{out}(j)$
(3) $G_{min}$, $G_{max}$ of $\theta_{out}(j)$
(4) $B_{min}$, $B_{max}$ of $\theta_{out}(j)$
(5) Counts of the histogram for $\theta_{out}(j)$, that is, total number of the frequency of use of color (integer data)

Figure 14:
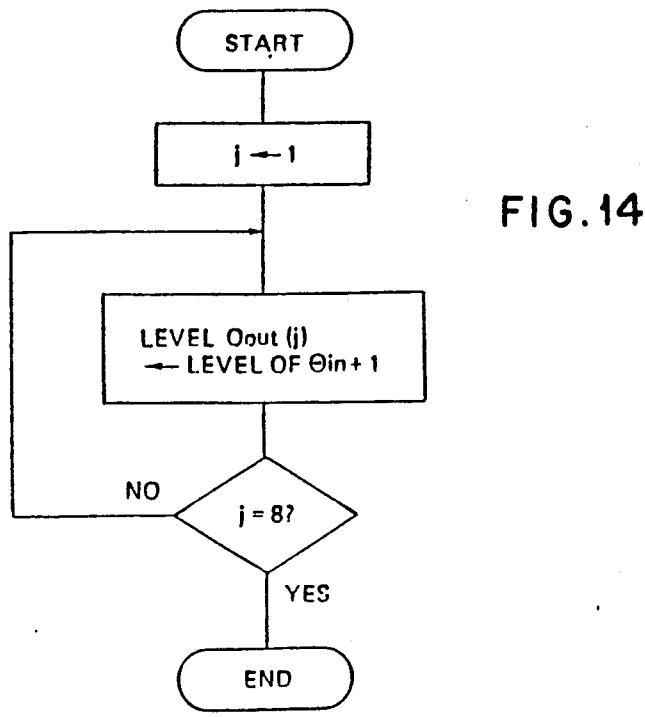
FIG. 14 is a diagram illustrating the process for calculating the tree-structured level of a child color-space (processor 2-1).

The CPU of the processor 2-1 executes the following operation.
(i) Calculation of $\theta_{out}(j)$ level
(ii) Calculation of $R_{min}$, $R_{max}$, $G_{min}$, $G_{max}$, $B_{min}$, $B_{max}$ of $\theta_{out}(j)$
(iii) Calculation of total number of the frequency of use of color in $\theta_{out}(j)$ FIG. 14 shows the procedure of operation (i).

Figure 15:
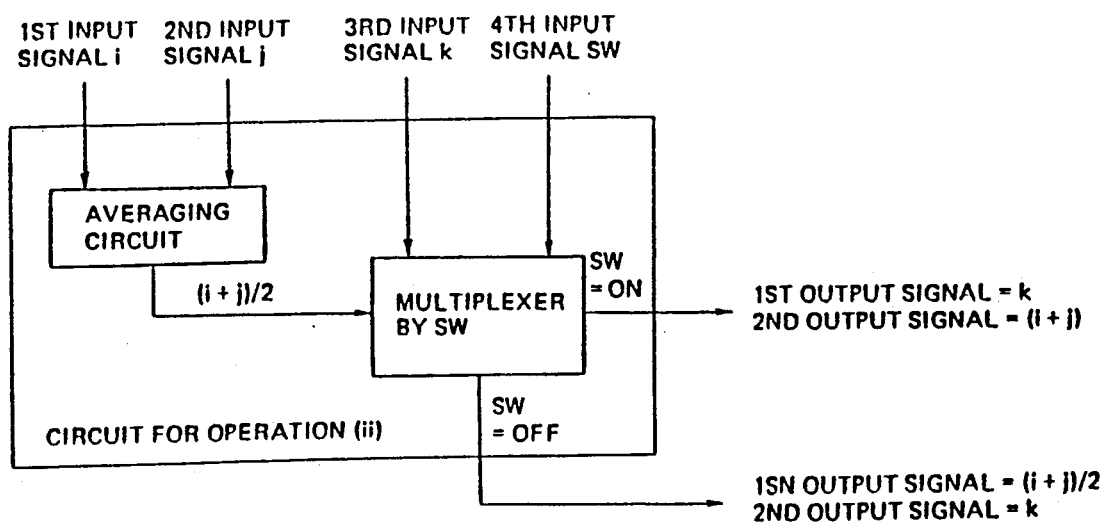
FIG. 15 is a diagram illustrating the process for calculating a range of a color-space occupied by a child color-space (processor 2-1). p

FIG. 15 shows a circuit used for the procedure of operation (ii).

For sake of simplicity, an input signal string is sequentially represented by a set of four elements, (i, j, k, SW), and an output signal string is represented by a set of two elements, (k, (i+j)/2) or ((i+j)/2, k). By using them, the entire operation process of (ii) is given as follows (the left side of the arrow indicating the output string, and the right side indicating the input string):

For $\theta_{out}(1)$
($R_{min}$, $R_{max}$) ← ($R_{min}$ of $\theta_{in}$, $R_{max}$ of $\theta_{in}$, $R_{min}$ of $\theta_{in}$, ON)
($G_{min}$, $G_{max}$) ← ($G_{min}$ of $\theta_{in}$, $G_{max}$ of $\theta_{in}$, $G_{min}$ of $\theta_{in}$, ON)
($B_{min}$, $B_{max}$) ← ($B_{min}$ of $\theta_{in}$, $B_{max}$ of $\theta_{in}$, $B_{min}$ of $\theta_{in}$, ON)
For $\theta_{out}(2)$ -continued $(R_{min}, R_{max}) \leftarrow (R_{min}$ of $\theta_{in}, R_{max}$ of $\theta_{in}, R_{max}$ of $\theta_{in}$, OFF)
$(G_{min}, G_{max}) \leftarrow (G_{min}$ of $\theta_{in}, G_{max}$ of $\theta_{in}, G_{min}$ of $\theta_{in}$, ON)
$(B_{min}, B_{max}) \leftarrow (B_{min}$ of $\theta_{in}, B_{max}$ of $\theta_{in}, B_{min}$ of $\theta_{in}$, ON)
For $\theta_{out}$ (3)
$(R_{min}, R_{max}) \leftarrow (R_{min}$ of $\theta_{in}, R_{max}$ of $\theta_{in}, R_{min}$ of $\theta_{in}$, ON)
$(G_{min}, G_{max}) \leftarrow (G_{min}$ of $\theta_{in}, G_{max}$ of $\theta_{in}, G_{max}$ of $\theta_{in}$, OFF)
$(B_{min}, B_{max}) \leftarrow (B_{min}$ of $\theta_{in}, B_{max}$ of $\theta_{in}, B_{min}$ of $\theta_{in}$, ON)
For $\theta_{out}$ (4)
$(R_{min}, R_{max}) \leftarrow (R_{min}$ of $\theta_{in}, R_{max}$ of $\theta_{in}, R_{max}$ of $\theta_{in}$, OFF)
$(G_{min}, G_{max}) \leftarrow (G_{min}$ of $\theta_{in}, G_{max}$ of $\theta_{in}, G_{max}$ of $\theta_{in}$, OFF)
$(B_{min}, B_{max}) \leftarrow (B_{min}$ of $\theta_{in}, B_{max}$ of $\theta_{in}, B_{min}$ of $\theta_{in}$, ON)
For $\theta_{out}$ (5)
$(R_{min}, R_{max}) \leftarrow (R_{min}$ of $\theta_{in}, R_{max}$ of $\theta_{in}, R_{min}$ of $\theta_{in}$, ON)
$(G_{min}, G_{max}) \leftarrow (G_{min}$ of $\theta_{in}, G_{max}$ of $\theta_{in}, G_{min}$ of $\theta_{in}$, ON)
$(B_{min}, B_{max}) \leftarrow (B_{min}$ of $\theta_{in}, B_{max}$ of $\theta_{in}, B_{max}$ of $\theta_{in}$, OFF)
For $\theta_{out}$ (6)
$(R_{min}, R_{max}) \leftarrow (R_{min}$ of $\theta_{in}, R_{max}$ of $\theta_{in}, R_{max}$ of $\theta_{in}$, OFF)
$(G_{min}, G_{max}) \leftarrow (G_{min}$ of $\theta_{in}, G_{max}$ of $\theta_{in}, G_{min}$ of $\theta_{in}$, ON)
$(B_{min}, B_{max}) \leftarrow (B_{min}$ of $\theta_{in}, B_{max}$ of $\theta_{in}, B_{max}$ of $\theta_{in}$, OFF)
For $\theta_{out}$ (7)
$(R_{min}, R_{max}) \leftarrow (R_{min}$ of $\theta_{in}, R_{max}$ of $\theta_{in}, R_{min}$ of $\theta_{in}$, ON)
$(G_{min}, G_{max}) \leftarrow (G_{min}$ of $\theta_{in}, G_{max}$ of $\theta_{in}, G_{max}$ of $\theta_{in}$, OFF),
$(B_{min}, B_{max}) \leftarrow (B_{min}$ of $\theta_{in}, B_{max}$ of $\theta_{in}, B_{max}$ of $\theta_{in}$, OFF)
For $\theta_{out}$ (8)
$(R_{min}, R_{max}) \leftarrow (R_{min}$ of $\theta_{in}, R_{max}$ of $\theta_{in}, R_{max}$ of $\theta_{in}$, OFF)
$(G_{min}, G_{max}) \leftarrow (G_{min}$ of $\theta_{in}, G_{max}$ of $\theta_{in}, G_{max}$ of $\theta_{in}$, OFF)
$(B_{min}, B_{max}) \leftarrow (B_{min}$ of $\theta_{in}, B_{max}$ of $\theta_{in}, B_{max}$ of $\theta_{in}$, OFF)

Figure 16:
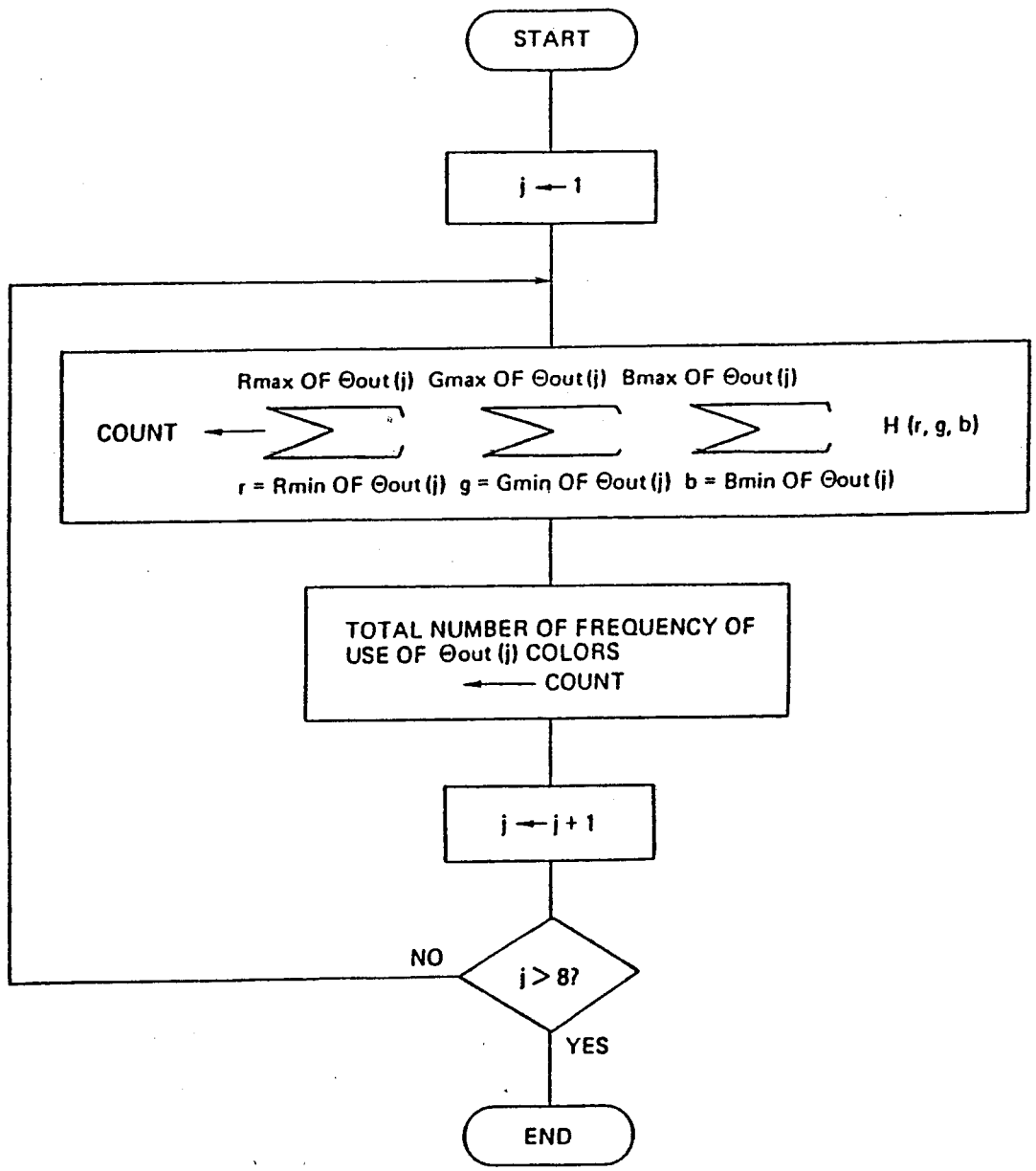
FIG. 16 is a diagram illustrating the process for calculating the frequency of use of colors (counts) in the child color-space (processor 2-1).

The operation of (iii) is processed in the flow shown in FIG. 16 by usig the output signals of (ii).

(2) Processor 2—2 (processor for inserting and sorting the division priority management list)

The processor 2—2 receives a divided color-space to be inserted as the input signals, and generates a division priority management list inserted with the divided color-space as the output signals.

(Input signals): The divided color-space subject to insertion being represented by $\theta_{in}$

| | |
|---|---|
| (1) Level of $\theta_{in}$ | (integer data) ... being represented by "level$_{in}$" |
| (2) Total number of the frequency of use of color in $\theta_{in}$ | (integer data) |
| (3) ID of $\theta_{in}$ | (integer data) |
| (4) m | (data of number of bits in a histogram) |
| (5) N$_{in}$ | (number of entries in the division priority management list: before insertion) |
| (Output signals): | |
| (1) N$_{out}$ | (number of entries in the division priority management list: after insertion) |
| (2) ID (i) | (ID of the i-th child color-space in the list (1 $\leq$ i $\leq$ N$_{out}$): integer data) |
| (3) VAL (i) | (space-occupying number for processor 2-2. |

Wherein VAL (i) is integer data values of which are sorted in the descending order. The space-occupying number is given by the following equation:

$$\text{Space-governing number} = \text{(Total number of frequency of use of color contained in the divided color-space)} \times \text{(Weighing-factor corresponding to the level of the divided color-space)}$$

The weighing-factor provides weighing $(m+1-\text{level})$ times for the direction of each axis of an RGB space according to the level of the divided color-space so that it can accommodate to division of a "m" bits space. That is, it indicates how many times wider area the space has than the state where it is exactly divided into "m" in the direction of axis (m=level). Because the RGB space is in fact three-dimensional, the weighing-factor is defined as $(m+1-\text{level})^3$.

Figure 17:
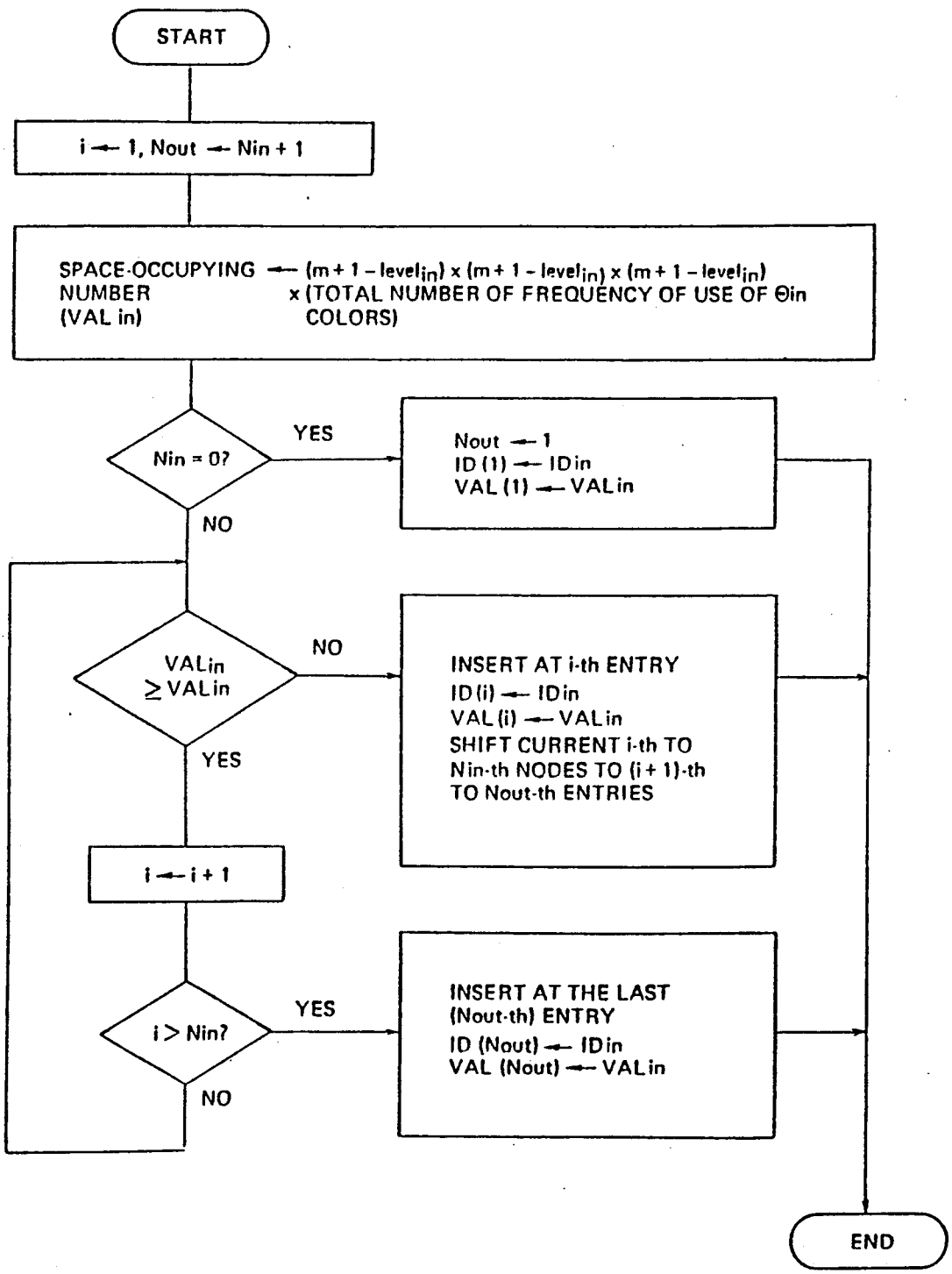
FIG. 17 is a diagram illustrating the process for inserting and sorting the division priority management list (processor 2-2).

FIG. 17 shows the processing procedure of the processor 2—2.

(3) Processor 2-3 (processor for deleting the entry at the end of the division priority management list)

The processor 2-3 receives the current division priority management list as the input signals, and generates a division priority management list, the entry at the end of which is deleted, as the output signals.

| | |
|---|---|
| (Input signals): | |
| (1) N$_{in}$ | (number of entries in the division priority management list: before deletion) |
| (2) ID (i) | (ID of the i-th divided color-space in the list (1 $\leq$ i $\leq$ N$_{in}$): integer data) |
| (3) VAL (i) | (space-occupying number for the i-th divided color-space in the list) |
| (Output signals): | |
| (1) N$_{out}$ | (number of entries in the division priority management list: after deletion) |
| (2) ID (i) | (ID of the i-th divided color-space in the list (1 $\leq$ i $\leq$ N$_{out}$): integer data) |
| (3) VAL (i) | (space-occupying number for the i-th divided color-space in the list) |

(4) Processor 2-4 (processor for indicating the division priority)

The processor 2-4 receives the division priority controlling pointer CPTR and the division priority management list as the input signals, and generates divided color-spaces (octants) as the output signals.

| | |
|---|---|
| (Input signals): | |
| (1) CPTR | (division priority controlling |

-continued

| | | |
|---|---|---|
| (2) N | pointer: integer data)<br>(number of entries in the division priority management list: integer data) | |
| (3) ID (i) | (ID of the i-th divided color-space in the list ($1 \leq i \leq N$): integer data) | |
| (Output signals):<br>$\theta_{out}$ being the divided color-space of ID (CPTR) | | |
| (1) Level of $\theta_{out}$ | (integer data) | |
| (2) $R_{min}, R_{max}$ of $\theta_{out}$ | (integer data) | |
| (3) $G_{min}, G_{max}$ of $\theta_{out}$ | (integer data) | |
| (4) $B_{min}, B_{max}$ of $\theta_{out}$ | (integer data) | |
| (5) Total number of frequency of use of colors in $\theta_{out}$ | (integer data) | |

(5) Processor 2-5 (processor for judging divisibility)

The processor 2-5 receives a divided color-space, which is a candidate of division, a division priority management list and a histogram as the input signals, and generates judgement value whether or not it can be divided as the output signals.

| (Input signals): Color-space subject to division being represented by $\theta_{in}$ | |
|---|---|
| (1) Level of $\theta_{in}$ | (integer data) ... (being represented by level$_{in}$) |
| (2) Total number of frequency of use of colors in $\theta_{in}$ | (integer data) |
| (3) m | (data of number of bits in a histogram) |
| (4) N | (number of entries in the division priority management list: integer data) |
| (5) ID (i) | (ID of the i-th divided color-space in the list ($1 \leq i \leq N$): integer data) |
| (6) VAL (i) | (space-occupying number for the i-th divided color-space in the list) |
| (7) H (r, g, b) | (value data of a 3m bit histogram) |
| (Output signals): | |
| (1) Judgment value | (ON or OFF) |

Figure 18:
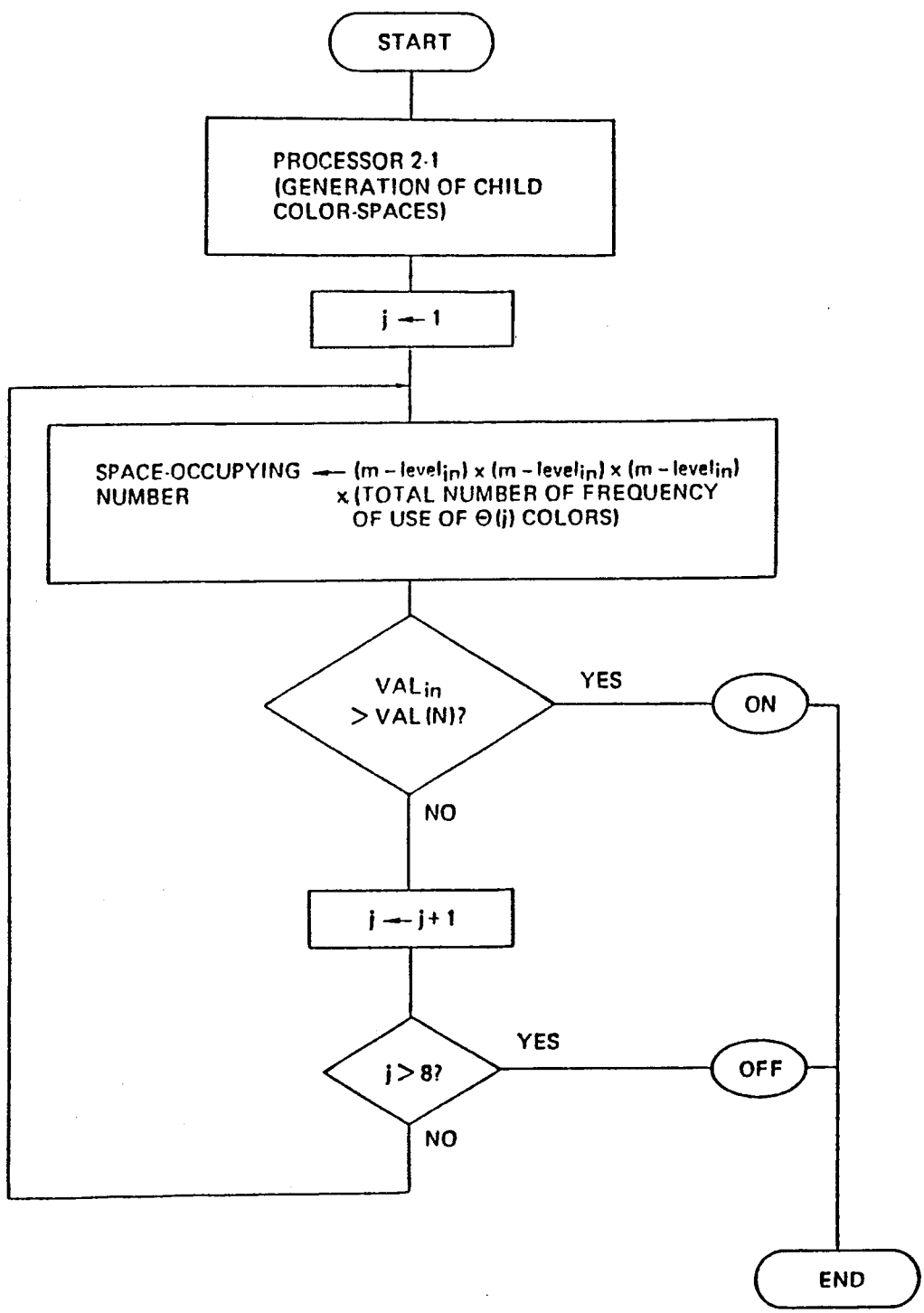
FIG. 18 is a diagram illustrating the process of the divisibility check (processor 2-5).

FIG. 18 shows the processing procedure. As shown in the figure, the processor 2-5 includes the processor 2-1.

(6) Processor 2-6 (processor for generating a color LUT)

The processor 2-6 receives the division priority management list, the divided color-space management list and the histogram as the input signals, and generates a color lookup table and an updated divided color-space management list as the output signals.

| (Input signals): $\theta_{in}$ (j) being the j-th divided color-space ($1 \leq j \leq M$) | |
|---|---|
| (1) K | (number of entries in the divided color-space management list: integer data) |
| (2) ID (i) | (ID of the i-th divided color-space in the list ($1 \leq i \leq K$): integer data) |
| (3) M | (total number of divided color-spaces in the divided color-space management list: integer data) |
| (4) ID of $\theta_{in}$ (j) | (integer data) |
| (5) H (r, g, b) | (histogram: integer data) |
| (6) $R_{min}, R_{max}, G_{min}, G_{max}, B_{min}, B_{max}$ of $\theta_{in}$ (j) | (integer data) |
| (Output signals): $\theta_{out}$ (j) being the j-th divided color-space ($1 \leq j \leq M$) | |
| (1) R (i) | (value of red of the i-th index ($1 \leq i \leq K$): integer data) |
| (2) G (i) | (value of green of the i-th index: integer data) |
| (3) B (i) | (value of blue of the i-th index: integer data) |
| (4) Index value of $\theta_{out}$ (j) | (integer data) |

Although the total number of the divided color-spaces in the divided color-space management list is represented by M herein, it always has a relation of $K \leq M \leq N_e$ where $N_e$ is the number of non-zero entries in the histogram H (r, g, b).

In this processor, only "K" out of M output signals of $\theta_{out}$ (j) ($1 \leq j \leq M$) are actually set with values.

The processor 2-6 has the following two major processes.

(i) Scan the division priority management list, and set a color index value of a corresponding divided color-space in the table.

(ii) Scan the division priority management list, and set color data (r, g, b) of a corresponding color index value in the table.

Figure 19:
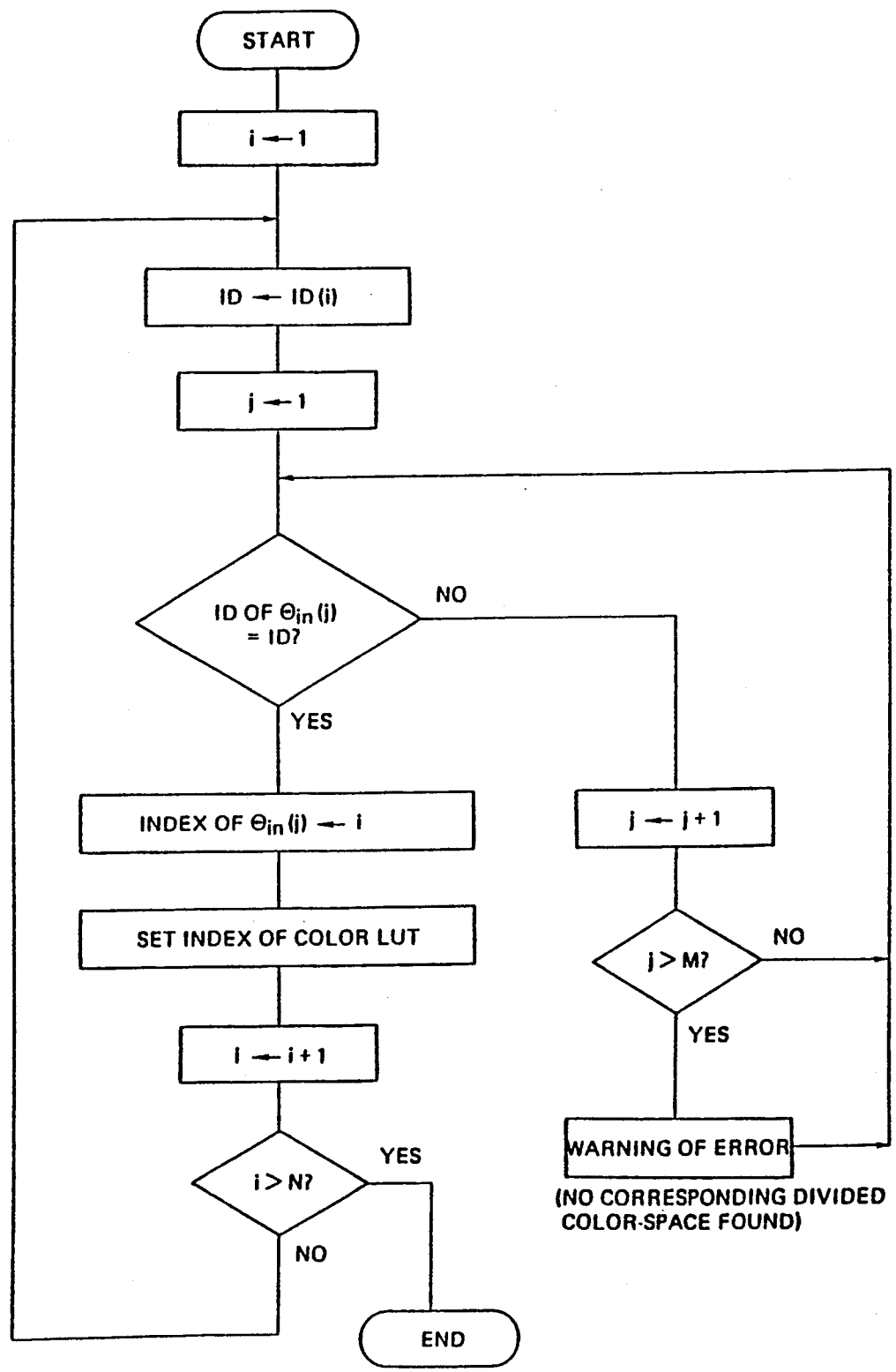
FIG. 19 is a diagram illustrating the process for setting color indices in the color lookup table (processor 2-6).
Figure 20:
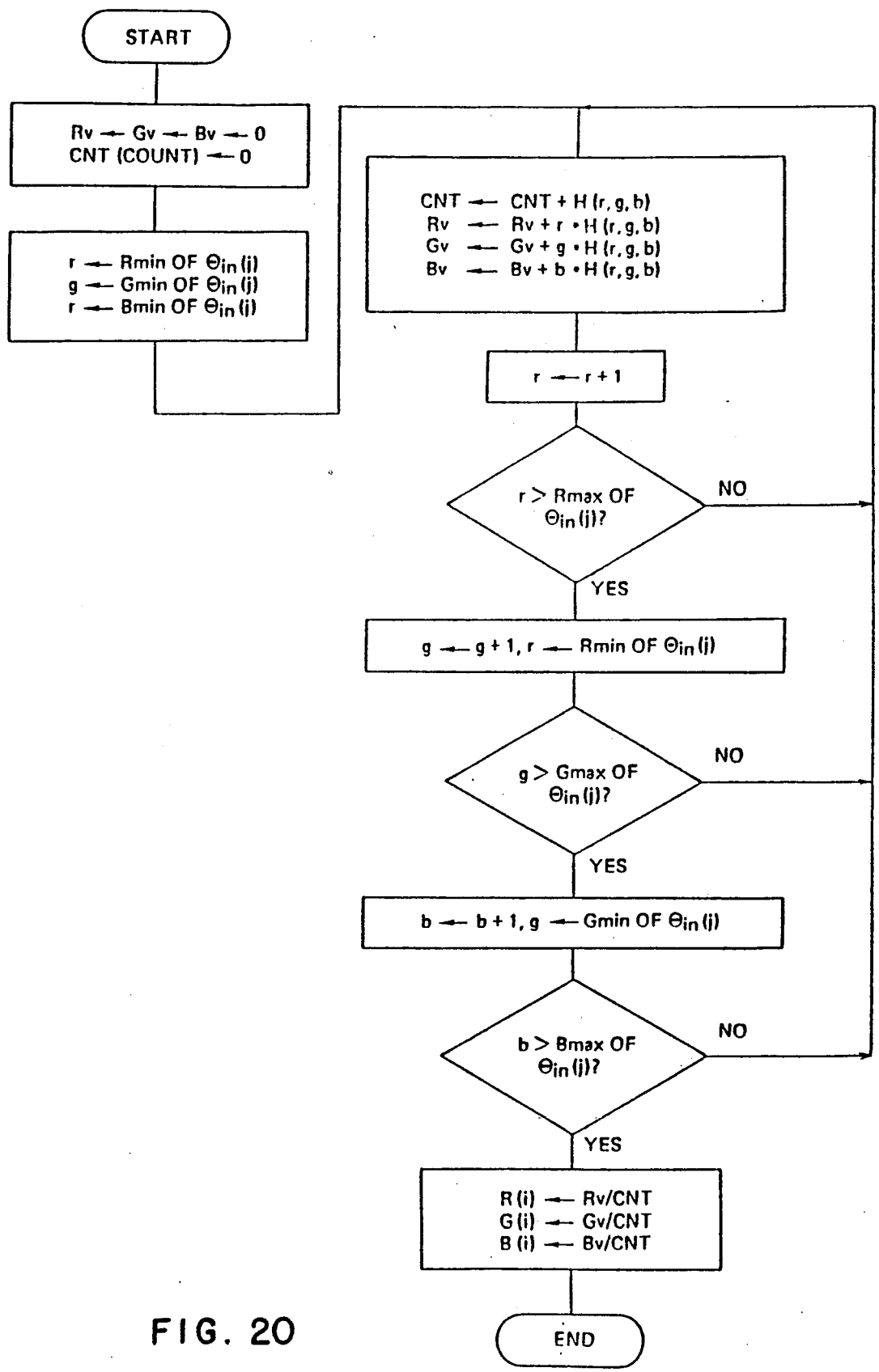
FIG. 20 is a diagram illustrating the process for setting color data in the color lookup table (processor 2-6).

In fact, both (i) and (ii) can be concurrently calculated. FIGS. 19 and 20 show their processing flows.

The processing flow of FIG. 20 determines an average value obtained from color data of colors contained in a representative color-space weighed by the frequency of use of that color, as a representative color. Of course, a color with the highest frequency in the representative color-space may be selected as the representative color, but the process as shown in FIG. 20 is preferable when taking image quality into consideration.

Once the representative color is determined, a color index is set to a corresponding entry in the histogram.

2) Step 3: Mapping to neighboring representative color

Figure 21:
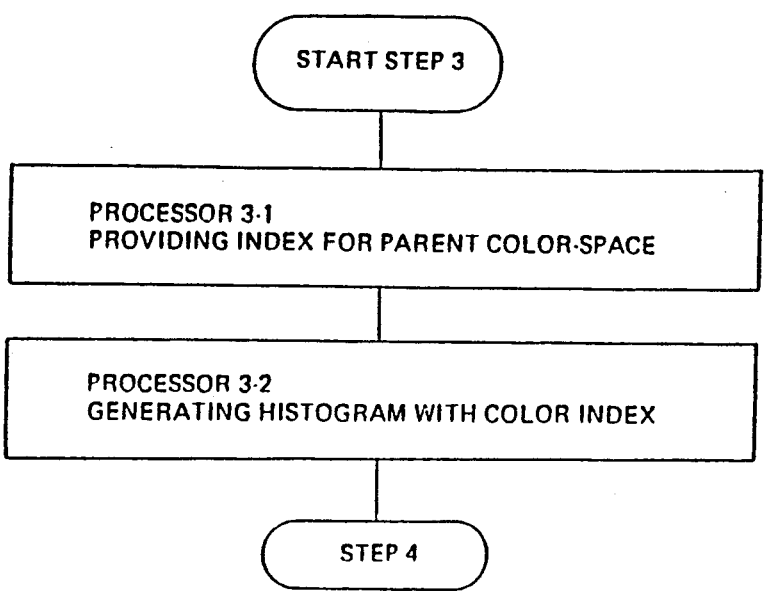
FIG. 21 is a diagram illustrating the processing flow of Step 3 in detail.

FIG. 21 shows the processing flow of the neighborhood representative color mapping device. The device has two processors. Following shows input signals, output signals, and processing flows of each processor.

(1) Processor 3-1 (processor for providing color index to parent color-space)

The processor 3-1 receives the divided color-space management list as the input signals, sets a color index of a child color-space with the largest space-occupying number to the parent color-space in the list, and generates an updated divided color-space management list as the output signals.

| (Input signals): The root divided color-space of the divided color-space management list to be represented by $\theta_{in}$ | |
|---|---|
| (1) Index value of $\theta_{in}$ | (integer data) |
| (2) ID of $\theta_{in}$ | (integer data) |
| (3) Parent color-space flag of $\theta_{in}$ | (integer data) |
| (4) Child color-space ID of $\theta_{in}$ | (integer data) |
| (5) M | (total number of divided color-spaces: integer data) |

-continued

| (Output signals): The j-th divided color-space to be represented by $\theta_{out}(j)$ $(1 \leq j \leq M)$ |
|---|

(1) Index value of $\theta_{out}(j)$

Figure 22:
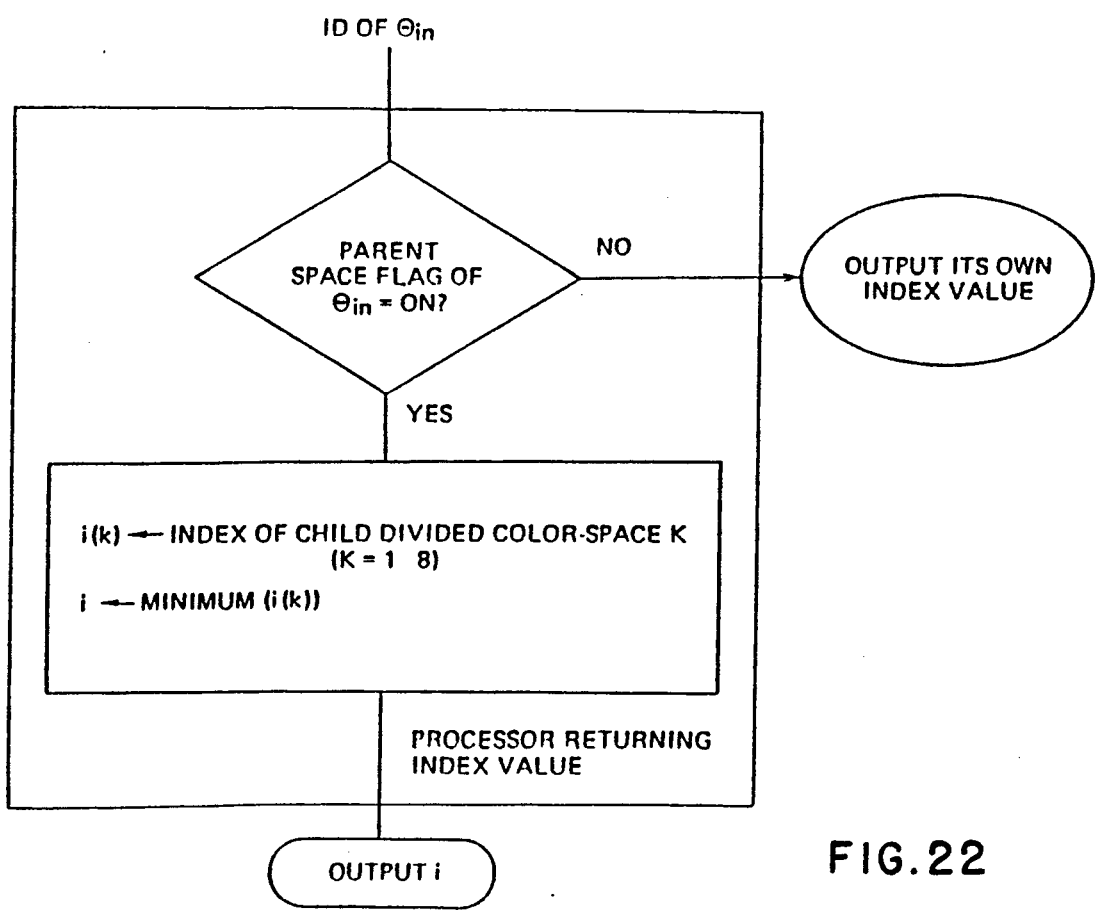
FIG. 22 is a diagram illustrating the process for providing the color indices with the parent color-space (processor 3-1).

This processor can be very simply described by using recursive processing. Only an initial value and the root divided color-space of the divided color-space management list are given as the input signals. Then, the process is performed in the flow as shown in FIG. 22. However, it is assumed that large integers are set in the divided color-space management list for the divided color-spaces other than those having the index values (value of 1 to K) set by the processor 2-6. Because a child color-space with the largest space-occupying number appears at the top of the division priority management list, it corresponds to the space with the smallest index value.

(2) Processor 3-2 (processor for generating color index portion of a histogram)

The processor 3-2 receives a histogram with a color index having non-zero entries of $N_e$ (FIG. 11B), a color lookup table having "k" color indexes, and the divided color-space management list as the input signals, and generates an updated histogram with color indices.

| (Input signals): The root divided color-space of the divided color-space management list to be represented by $\theta_{in}$ | |
|---|---|
| (1) H (r, g, b) | (frequency of use portion of a histogram: integer data) |
| (2) I (r, g, b) | (color index portion of the histogam: integer data) |
| (3) Index value of $\theta_{in}$ | (integer data) |
| (4) ID of $\theta_{in}$ | (integer data) |
| (5) Parent color-space flag of $\theta_{in}$ | (integer data) |
| (6) Child color-space ID of $\theta_{in}$ | (integer data) |
| (7) M | (total number of divided color-spaces: integer data) |
| (8) R (i), G (i), B (i) | (color lookup table: integer data) |
| (9) K | (number of colors to be given: integer data) |
| (Output signals): | |
| (1) I (r, g, b) | (histogram with color index (color index portion): integer data) |

Figure 23:
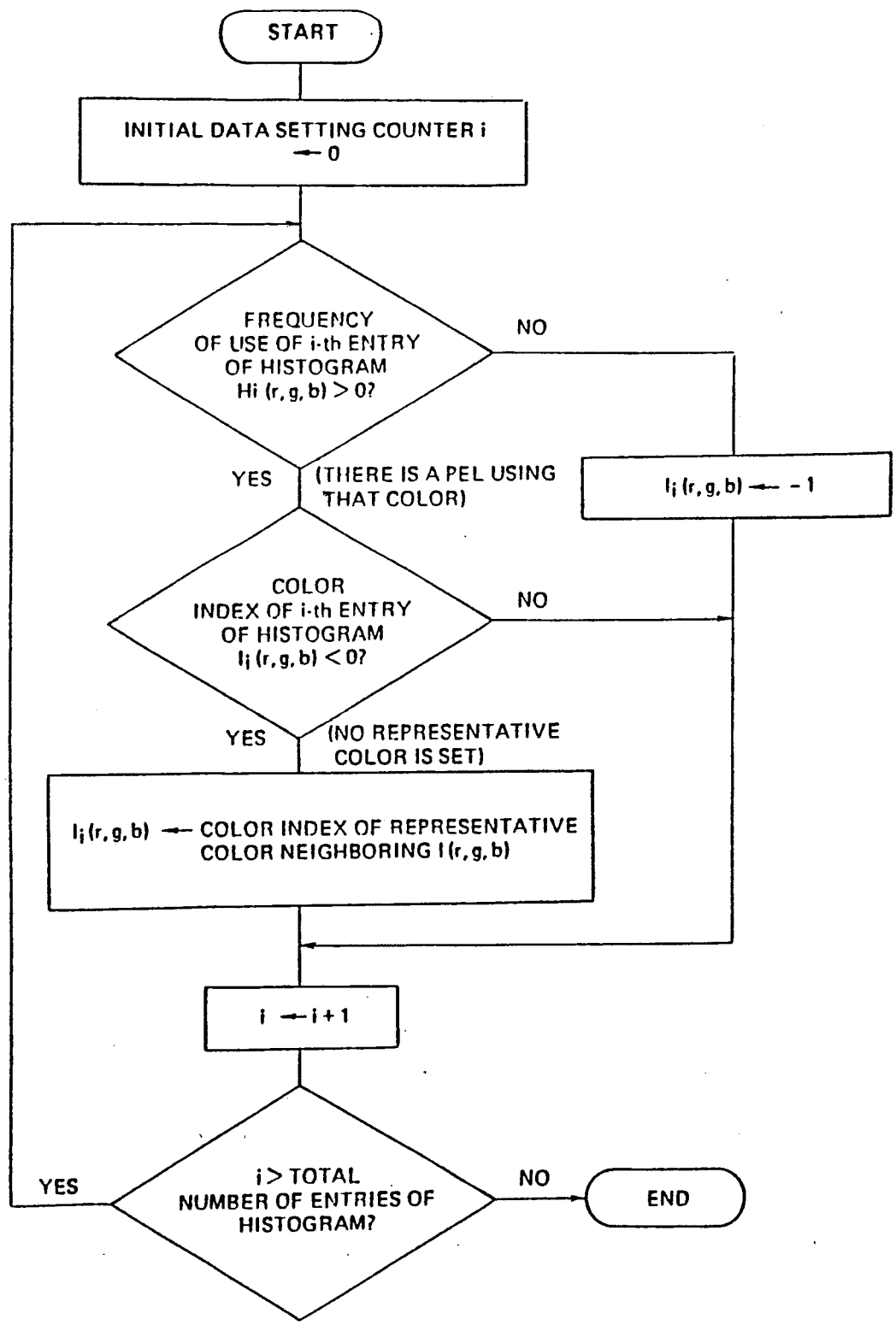
FIG. 23 is a diagram illustrating the process for setting the color indexes in the color indexed histogram (processor 3-2).

FIG. 23 shows the processing flow of the processor 3-2. As shown in the figure, the process for providing the color index of the neighborhood representative color is performed by traversing the divided color-space management list provided with the color index as described above.

III Example of execution

Examples of output results from each step are indicated by assuming that an original image has 256 pels, the number of representative colors k=10, number of bits of each component of red, green and blue of a color space for a histogram m=4.

III-I. Step 1

A histogram (4 bits for each of R, G, and B) is created from the original image (FIG. 24).

III-II. Step 2

Figure 26:
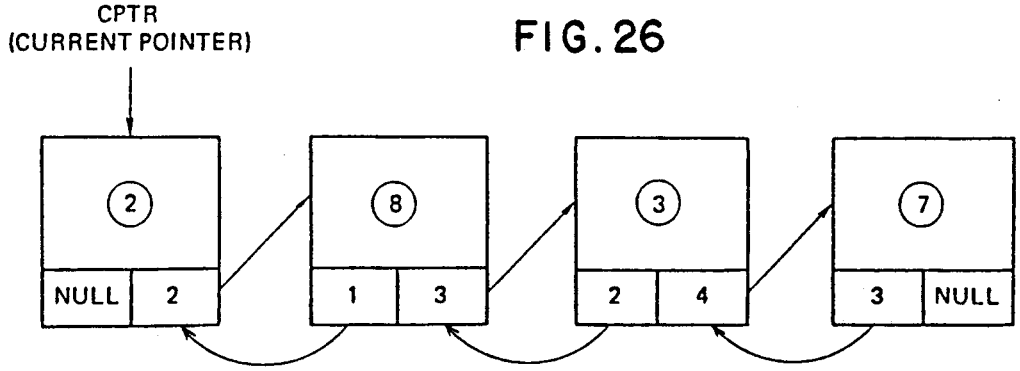
FIGS. 26, and 29 through 35 are diagrams illustrating the process for generating the division priority management list.
Figure 27:
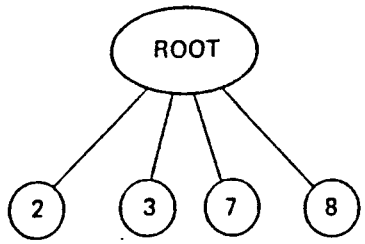
FIG. 27 is a diagram illustrating an example of the divided color-space management list.

(1) Because the number of non-zero entries in the histogram (15) is larger than k(10), the color-space is divided into eight by the processor 2-1. FIG. 25 shows the result. FIGS. 26 and 27 show the division priority management list and the divided color-space management list at that moment, respectively.

(2) It is assumed that N is the number of elements in the division priority management list. Because of $N \leq k$ (N=4, k=10), the color-space (2) is selected as the color-space subject to the dividing process. Then, it is divided into eight. Now, it should be noted that notation (2)-(1) means that the parent is divided color-space (2) and the child is (1). FIG. 28 shows the result of division.

The processor 2-2 inserts and sorts these child-spaces. The divided color-spaces are arranged in the descending order of the space-occupying number that is the total number of the frequency of use of color weighed by level. The weighing-factor is given by the rule shown in FIG. 6.

Figure 29:
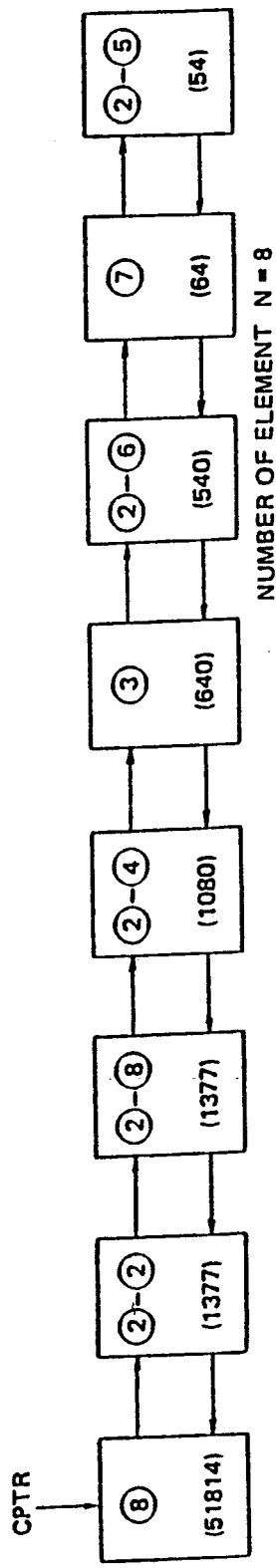

Thus, the division priority management list shown in FIG. 29 is obtained. The value in the parentheses is a value by multiplying the total number of frequency by the weighing-factor (space-occupying number).

Figure 30:
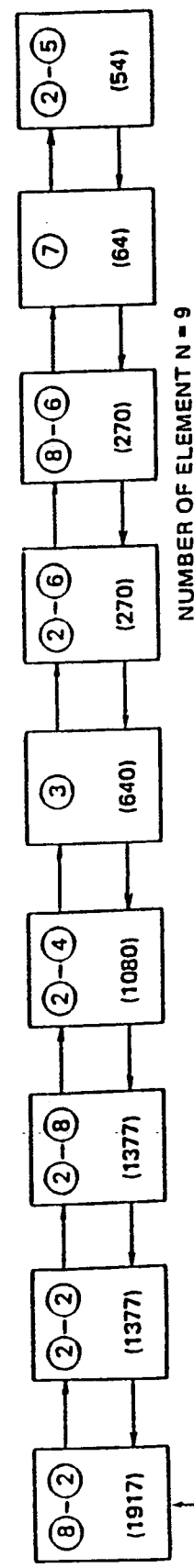

(3) Because $N \leq k$ (N=8, k=10), the divided color-space (8) is selected as the divided color-space subject to the dividing process, and divided into eight. The resultant division priority management list is shown in FIG. 30.

Figure 31:
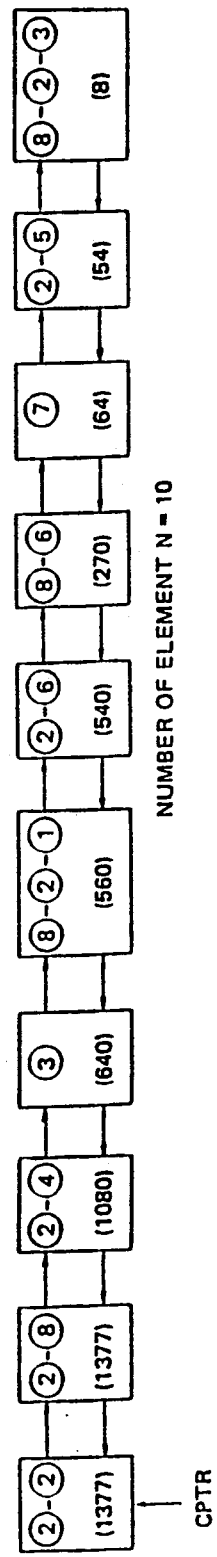

(4) Because still $N \leq k$ (N=9, k=10), the divided color-space (8)—(2) is selected as the divided color-space subject to the dividing process, and divided into eight. The resultant division priority management list is shown in FIG. 31.

(5) Because N=k is attained, the processor 2-5 subsequently checks the divisibility in the dividing process.

Because CPTR is not equal to k, the divided color-space (2)—(2) is selected as the divided color-space subject to the dividing process.

Divisibility check

Figure 32:
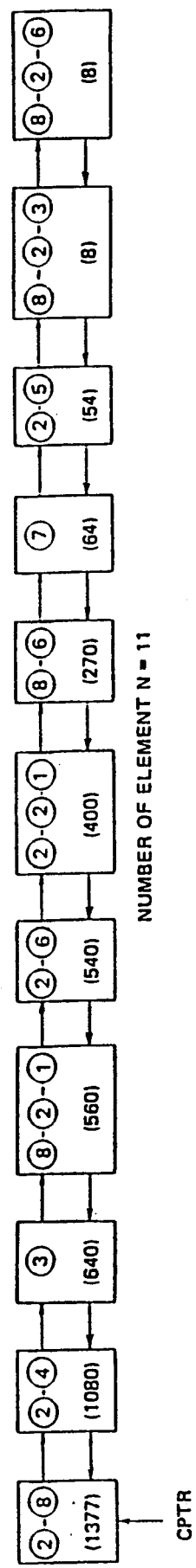

Assuming that (2)—(2) is divided, the child color space with the highest frequency is (2)-(2)-(1). The value of it multiplied with the weighing-factor is 8*50=400, which is larger than the space-occupying number (8) for the last entry of the division priority management list. Thus, it is actually divided. The resultant division priority management list is shown in FIG. 32.

At the moment, because $N \leq k$, divided color-spaces to the number of M=N−k are deleted from the end of the division priority management list by the processor 2-3. That is, the entry of (2)-(2)-(6) is deleted.

(6) Because CPTR is not equal to k, the divided color-space (2)-(8) is selected as the divided color-space subject to the dividing process.

Divisibility check

Figure 33:
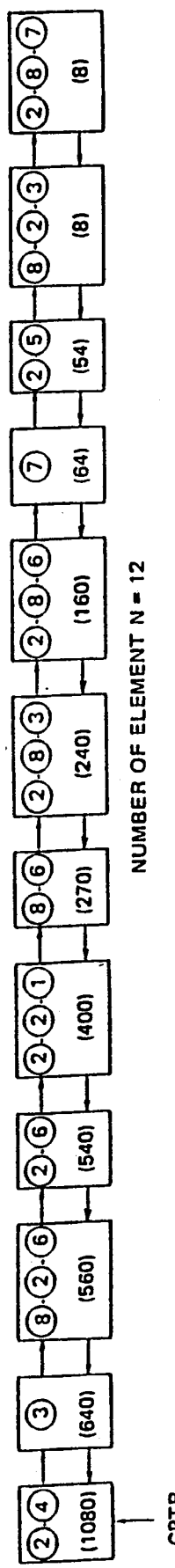

Assuming that (2)-(8) is divided, the child color space with the highest frequency is (2)-(8)-(3). The value of it multiplied with the weighing-factor is 8*30=240, which is larger than the value of the last entry (8) of the division priority management list. Thus, it is actually divided. The resultant division priority management list is shown in FIG. 33.

At the moment, because N≦k is attained again, divided color-spaces only to the number of M=N−k (=2) are deleted from the end of the division priority management list by the processor 2-3.

Figure 34:
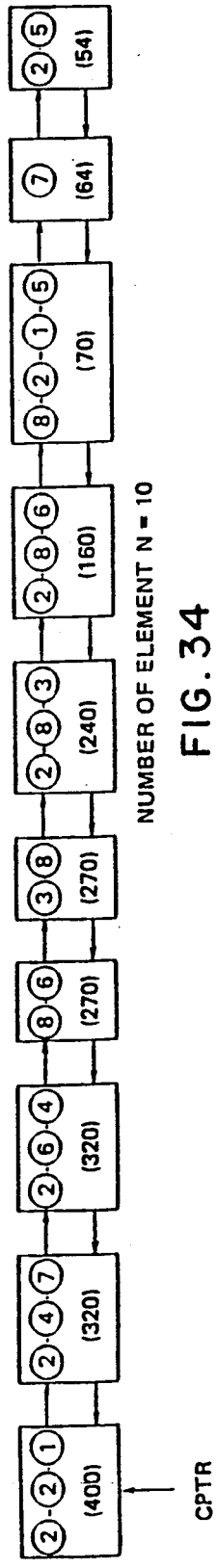

(7) When the dividing process is sequentially executed up to the divided color-spaces (2)-(4), (3), (8)-(2)-(1), and (2)-(6) in the exactly same manner, the division priority management list is as shown in FIG. 34.

Until this point, CPTR always points to the top element. However, if the divided color-space (2)-(2)-(1) is then selected and checked for divisibility, the one with the highest frequency of supposed child color-spaces is (2)-(2)-(1)-(7). However, the value multiplied with the weighing-factor is only 50. This is smaller than the value of the end of the division priority management list. Therefore, it is not divided. Thus, CPTR CPTR+1 is attained, which means that the divided color-space (2)-(2)-(1) is selected as the first object for output.

(8) Because CPTR (2) is not equal to k, it is intended to perform a similar dividing process with the divisibility check. The divisibility check judges that neither divided color-space of (2)-(4)-(7) nor (2)-(6)-(4) can be divided any more, and CPTR is incremented twice and becomes 4.

Figure 35:
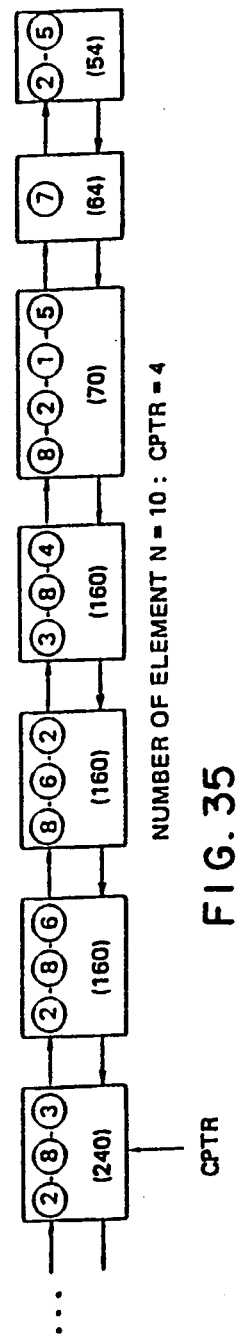

Because the color-space (8)-(6)-(2) that is one of supposed color-spaces of the divided color-space (8)-(6) has the largest space-occupying number (160), the color-space (8)-(6) is actually divided, and its child color-spaces are inserted and sorted in the division priority management list. The same is true of the divided color-space (3)-(8). Because the supposed color-space (3)-(8)-(4) has the space-occupying number of 160, the color-space (3)-(8) is actually divided, and its child color-spaces are inserted and sorted in the division priority management list. At the moment, the list after the CPTR is as shown in FIG. 35.

(9) Then, all of divided color-spaces pointed by the CPTR are rejected in the divisibility check, so that only the CPTR is repeatedly incremented and reaches the divided color-space (2)-(5) at the end of the division priority management list. Thus, CPTR=k is attained. Finally, the processor 2-6 provides color indices for the representative colors (r, g, b) corresponding to divided color-spaces from the top of the division priority management list.

III-III. Step 3

At the moment, the divided color-space management list has been obtained as shown in FIG. 3.

In the figure, a single circle represents each divided color-space, the upper part of which indicates the frequency of use of contained color, while the lower part of which indicates the color index in the color LUT. Although the divided color-space management list actually contains the space-occupying number, the total number of the frequency of use of colors contained in each space is indicated in the figure for convenience. A double circle represents a divided color-space remaining in the division priority management list obtained in Step 2 which a color index was assigned to in advance.

Figure 36:
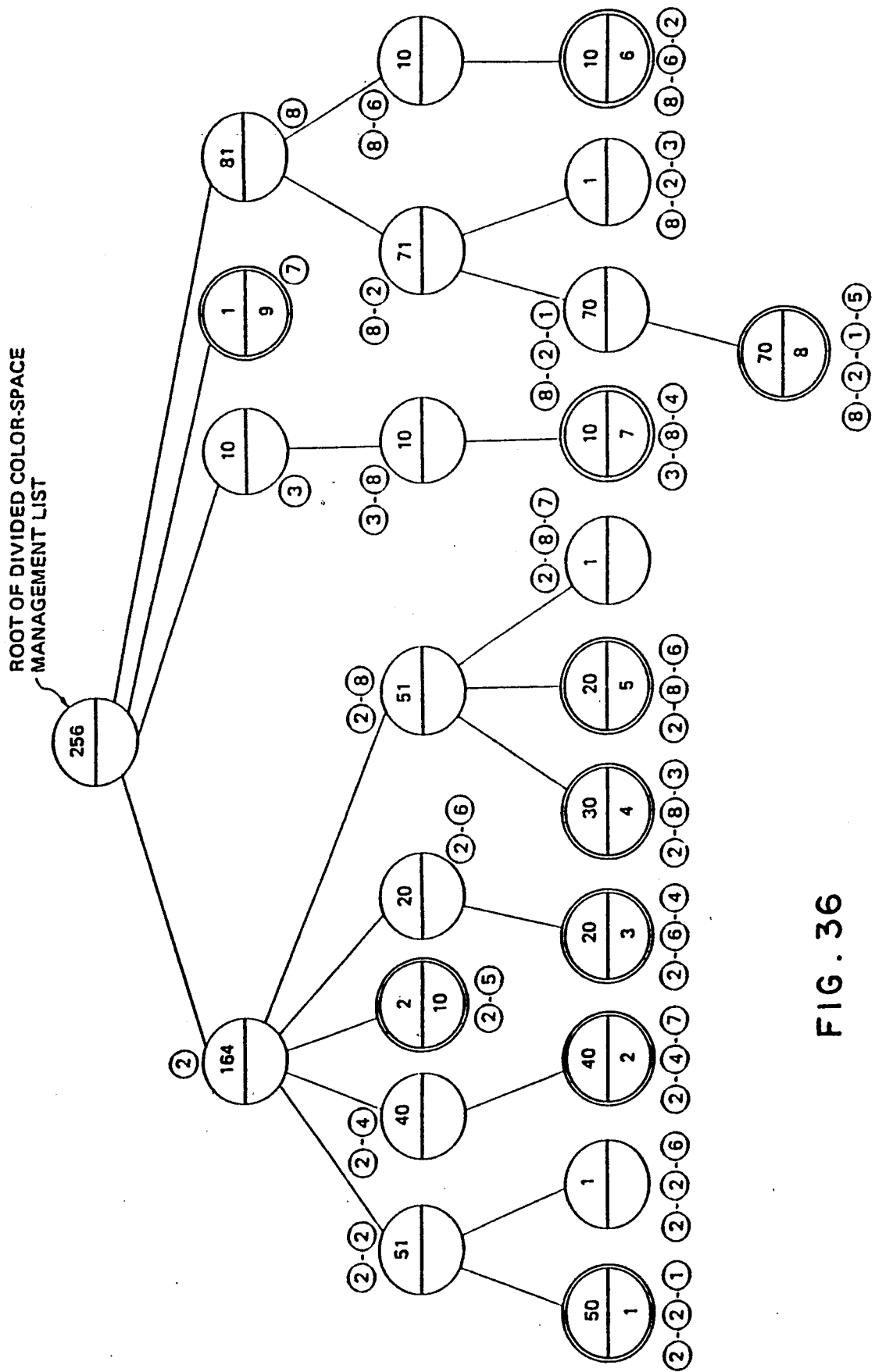
FIG. 36 through 38 are diagrams illustrating an example of final divided color-space management list.
Figure 37:
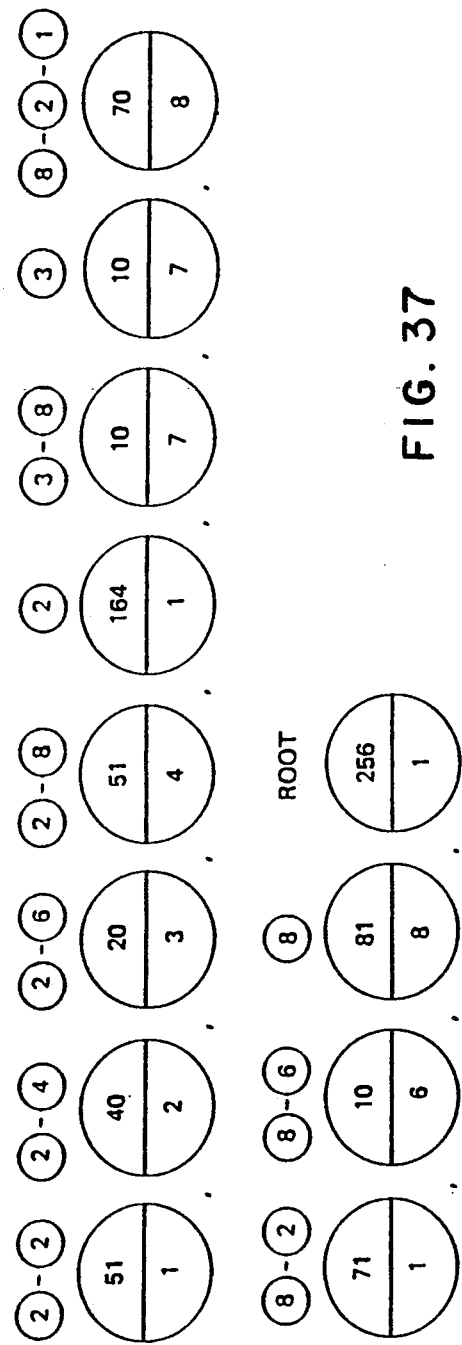

(1) The first process in Step 3 is the one in which each non-end node in the divided color-space management list of FIG. 36 is set with the child divided color-space of the highest frequency of use from its divided color-spaces, or the one with the largest space-occupying number. FIG. 37 shows the result of the setting.

(2) The second process in Step 3 is the one in which the color index is set for the end node for which the color index is not yet set while looking for it in the neighborhood. (No calculation is made for distance.) Its rule is to:

_a_ First, look for a brother divided color-space (from the closest one), and

_b_ If there is no brother, or if a color index is not set for a brother, if any, look for the color index that was set to the parent color-space in the above first process.

Figure 38:
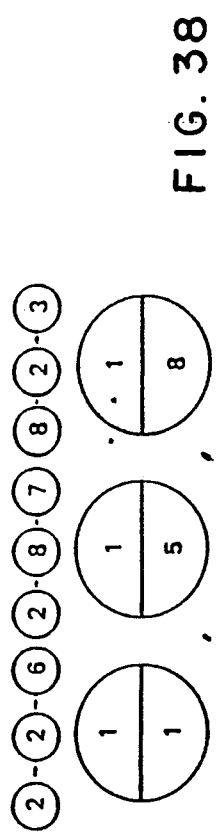

In this example, the result of setting is as shown in FIG. 38 according to _a_.

At the moment, all color indices are found, and there is no case where _b_ is applied.

By the way, the rule _b_ is the one against errors. In fact, even if, as in the case of the divided color-space (8)-(2)-(3), no index is set for the brother (8)-(2)-(1) in the initial stage, the color index is set in Step 1, so that there is no need to refer to the parent color-space (8)-(2) by applying the rule _b_.

Subsequently, as described, color indexes are provided for non-zero entries in the histogram for which no color index is yet provided by traversing the divided color-space management list determined as in FIGS. 36 through 38. These color indices are then set in the histogram.

III-IV. Step 4

An index image is created by using applicable color index values, which are determined by referring to the color indexed histogram based on the values of r, g, and b (4 bit values that were made the entries of the histogram in Step 1) of the original image while scanning it.

IV. Others

In the above, this invention is described for a specific embodiment. However, a number of variations may be possible for the invention.

For example, in the above embodiment, whenever the division priority management list is updated, its elements are rearranged in the descending order of the space-occupying number, so that the division priority controlling pointer (CPTR) points to an element as close to the top of the list as possible, or the one with as large a space-occupying number as possible. However, the division priority management list is not necessarily sorted. Of course, in that case, the process for determining the element pointed by the CPTR is more complicated.

In addition, in the above embodiment, it is arranged that the entries of the histogram store data of corresponding color indexes. However, it is possible to create a correlation table between the color and the color index separate from the histogram.

Furthermore, even if the invention is embodied according to the processes for the above embodiment, it is a matter of course that some steps may be changed in the sequence of the process. For example, setting of the color indexes in the histogram may be conducted in the above Step 3 for all entries.

It was already explained that the color-space subject to the division is not limited to three dimensions. In the above embodiment, although an equal number of bits are assigned to each basic component, it may be allowed for a color-space in which the number of bits assigned to a basic component differs from that for another component to be subject to division. In this case, the number of divisions for each time other than 2 may be set for the basic component in its axial direction. Of course, in the three-dimensional cubic color-space, as in the above embodiment, the number of divisions for each time may be intentionally set to a number other than 8.

We claim:

1. A method for color image quantization which comprises selecting "k" display colors among $2^{\epsilon n_i}$ colors obtained by assigning $n_i$ bits for representing the intensity level of each of "a" kinds of basic color, wherein the index (i) has values ($1 \leq i \leq a$), and quantizing an original color image comprising a number of pels for which any one of the said $2^{\epsilon n_i}$ colors may be assigned so that it may be displayed with said "k" display colors, further comprising:

(a) inputting the said original image, sampling it in a color-space defined by assigning $m_i$ ($m_i \leq n_i$) bits for representing intensity level of each of said "a" kinds of basic color,
and generating an a-dimension histogram, (b) repeating dividing a color-space into X child-spaces, when calculating a space-occupying number by:
calculating the number of pels assigned for colors within each generated child-space, referring to the said histogram,
and multiplying the calculation result by a weighting-factor corresponding to a level of the divided color-space, the weighing-factor having a decreasing value for deeper levels of division, (c) preparing a tree-structured list which describes a parent-child relationship of color-spaces, and updating the list by registering a newly generated color space each time a color space is divided, (d) selecting "k" color spaces as representative color spaces in descending order of the space-occupying number, among those located at ends of the tree-structured list.

(e) selecting a representative color for each of the said "k" representative color-spaces, and providing the representative color with an index, (f) for a color other than the representative color within each of the said "k" representative color-spaces, giving the non-representative color the index assigned to the representative color of the color-space,
for a color within a color-space other than the said representative color-spaces in the said tree-structured list, finding a representative color-space located close to the color-space in said tree-structured list, and giving it the index assigned to the found representative color-space, (g) for each pel in said original image, obtaining an index given to the color assigned to the pel, and storing it in a storage means.

2. A method for color image quantization which comprises selecting "k" display colors among $2^{\epsilon n_i}$ colors obtained by assigning $n_i$ bits for representing the intensity level of each of "a" kinds of basic color ($1 \leq i \leq a$), and quantizing original color image comprising a number of pels for which any one of the said $2^{\epsilon n_i}$ colors may be assigned so that it ay be displayed with the said "k" display colors, further comprising:

(a) inputting the said original image, sampling it in a color-space defined by assigning $m_i$ ($m_i \leq n_i$) bits for representing intensity level of each of the said "a" kinds of basic color,
and generating an a-dimension histogram, (b) repeating dividing a color-space into X child-spaces, when calculating a space-occupying number by:
calculating the number of pels assigned for colors within each generated child-space, referring to the said histogram,
and multiplying the calculation result by a weighing-factor corresponding to a level of the division, (c) preparing a tree-structured list which describes a parent-child relationship of color-spaces, and updating the list by registering a newly generated color space each time a color space is divided, (d) whenever said list is updated, selecting up to "k" color spaces in descending order of the space-occupying number, among those located at ends of the tree-structured list, (e) judging the divisibility of each of said selected color spaces in the descending order of space-occupying number of said color-space,
selecting said color-space as the representative color space if it is not divisible, or
selecting said color-space as the object of division if it is divisible, (f) stopping the division of the color-space at the time when the number of the representative color-spaces reaches "k", (g) selecting a representative color for each of the said "k" representative color-spaces, and providing the representative color with an index, (h) for a color other than the representative color within each of the said "k" representative color-spaces, giving the non-representative color the index assigned to the representative color of the color-space,
for a color within a color-space other than the said representative color-spaces in the said tree-structured list, finding a representative color-space located close to the color-space, and giving it the index assigned to the found representative color-space, (i) for each pel in the said original image, obtaining an index given to the color assigned to the pel, and storing it in a storage device.

3. An apparatus for color image quantization which comprises selecting "k" display colors among $2^{\epsilon n_i}$ colors obtained by assigning $2^{\epsilon n_i}$ bits for representing the intensity level of each of "a" kinds of basic color ($1 \leq i \leq a$), and quantizing original color image comprising a number of pels for which any one of the said $2^{\epsilon n_i}$ colors may be assigned so that it may be displayed with the said "k" display colors, further comprising:

(a) means for inputting the said original image, sampling it in a color-space defined by assigning $m_i$ ($m_i \leq n_i$) bits for representing intensity level of each of the said "a" kinds of basic color,
and generating an a-dimension histogram, (b) means for calculating a space-occupying number by:
(b1) whenever a color-space subject to division is selected, dividing said selected color-space into X child color-spaces,
(b2) providing an identifier for the child color-space generated through the division,
(b3) generating pointer data for relating said child space to the parent space,
(b4) calculating the number of pels assigned for colors within said generated child-space, by referring to the said histogram, and multiplying the calculation result by a weighing-factor corresponding to a level of the division,
(c) a first list for containing data obtained from the operations of said (b2) and (b4), based on the pointer data obtained from the operation of said (b3),
(d) means for registering child spaces at least the space-occupying number of which is non-zero, in said first list each time the color-space is divided,
(e) a second list for registering the identifiers and the space-occupying number of the generated color-spaces,
(f) means for, whenever a color-space is divided, cancelling registration of the divided color-space in the said second list, and for registering newly generated color-spaces in said second list,
(g) means for counting the number N of color-spaces registered in the second list, and, when N exceeds k, cancelling registration of (N−k) color-spaces from the second list in the ascending order of the space-occupying number,
(h) means for, whenever said second list is updated:
(h1) selecting the divisible color-space with the largest space-occupying number as an object of division from those contained in the updated color-space list,
(h2) in a case where said count N reaches "k", calculating the maximum value of the space-occupying number of child spaces that would be obtained if the selected color-space were divided, comparing said maximum value with the minimum value of the space-occupying numbers for the color-spaces in the current second list, and judging the divisibility of the selected color-space based on said comparison,
(h3) in a case where the color-space selected is judged not to be divisible by said comparison, cancelling the selection of said color-space as the object of division, and then repeating the operations of (h1) and (h2), for the divisible color-space remaining in the said second list,
(i) means for stopping the division of the color-space when all color-spaces in said second list are judged not to be divisible,
(j) means for selecting a representative color for each of the color-spaces registered in the said second list after the division of the color-space, and providing the representative color with an index,
(k) means for providing colors in the color-spaces registered in said second list with the index provided for the representative color of said color-space, and
for colors in the color-space not registered in said second list, for finding a color-space in said second list located in the neighborhood of said color-space by scanning said first list, and providing it with the index provided for the representative color of a found color-space; and
(l) means for finding an index provided for a color assigned to each pel of said original image, and storing the found index in a storage device.

4. An apparatus for color image quantization which comprises selecting "k" display colors from $2^{an}$ colors obtained by assigning n bits for representing the intensity level of each of "a" kinds of basic color, and quantizing the original color image comprising a number of pels for which any number of colors may be assigned so that it may be displayed with the selected display colors, further comprising:
(a) means for inputting the said original image, sampling it in a color-space defined by assigning m bits for representing intensity level of each of the said "a" kinds of basic color,
and generating an a-dimension histogram,
(b) means for calculating a space-occupying number by:
(b1) regularly dividing an a-dimension color-space into X,
(b2) providing identifiers for the child color-spaces generated through the division,
(b3) generating pointer data for relating said child spaces to the parent space,
(b4) calculating the number of pels of the original image assigned for colors within said divided child-space, by referring to the said histogram,
and multiplying said calculation result by a weighing-factor corresponding to a level of the division,
(c) means repeating operations of:
further evenly dividing a child color-space with a large space-occupying number into X so that the space-occupying numbers of the child color-spaces are balanced, and
executing the operations of (b2), (b3) and (b4),
(d) a divided color-space management list controlling the data obtained from the operations of (b2) and (b4) in a tree-structure based on the pointer data obtained from the operation of (b3),
(e) means for registering child spaces at least the space-occupying number of which is non-zero, as color-space elements in said divided color-space controlling list whenever the division by means (b) or (c) is performed,
(f) division priority management list of color-spaces for registering identifiers and space-occupying number of the color-spaces divided by means (b) or (c),
(g) means for, whenever a color-space is divided by said means (b) or (c), registering newly generated color-spaces in the division priority management list, and for rearranging the color-space elements in said list in the descending order of the space-occupying number,
(h) a means for cancelling the registration of (N−k) color-spaces from the division priority management list in the ascending order of the space-occupying number when the number N of the color-space elements registered in the division priority management list exceeds "k,"
(i) a means for, whenever said division priority management list is updated;
(i1) selecting a color-space generated by the division less than "m" times but having the largest space-occupying number in the updated division priority management list as the color-space subject to the division by means (c), or
(i2) in a case where the number N of the color-space elements registered in said division priority management list reaches "k," selecting a candidate color-space for division in the descending order of the space-occupying number, and calculating the maximum value of the space-occupying numbers for child spaces obtained by supposedly dividing said candidate color-space evenly into X, comparing said maximum value with the minimum value of the space-occupying for the color-spaces in the division priority management list, and selecting said candidate color-space as the color-space subject to the division by means (c) if the former is larger than the latter, and (i3) judging that said candidate color-space is not divisible if said comparison reveals that the former is not greater than the latter, and then repeating the operation of (i2) for a color-space in said division priority management list that is not yet selected as the candidate for the division, (j) means for stopping the division of color-space when all color-spaces in said division priority management list are judged to be not divisible by means (i), (k) means selecting a color representing each of color-spaces registered in said division priority management list after stopping the division, providing a color index for said representative color, and generating a color lookup table, (l) a means for providing the color index for the color-space determined by means (j) for a corresponding color-space in the division priority management list as well, and providing a parent color-space having child color-spaces in the division priority management list with the color index for the child color-space having the largest space-occupying number recursively, (m) means for finding for a color-space not yet provided with a color index in said division priority management list a color indexed color-space located on the tree-structure in the neighborhood of said color-space, and providing the color index provided for the found neighborhood color-space to said color-space not yet provided with a color index, and (n) a means for determining to which color-space in the divided color-space management list the color assigned to each pel of said original image belongs, and storing the color index provided for the determined color space in a memory for display.

5. A method for color image quantization claimed in claim 1 or 2, wherein said weighing factor becomes larger as the division level becomes higher.

6. A method for color image quantization claimed in claim 1 or 2, wherein said "a" kinds of basic colors include red, green, and blue.

7. An apparatus for color image quantization claimed in claim 4, wherein X is equal to $2^a$.

* * * * *

UNITED STATES PATENT AND TRADEMARK OFFICE
CERTIFICATE OF CORRECTION

PATENT NO. : 5,049,986  
DATED : September 17, 1991  
INVENTOR(S) : M. Aono, et al Page 1 of 2

It is certified that error appears in the above-identified patent and that said Letters Patent is hereby corrected as shown below:

Col. 3, line 46 delete the expression "$2^{\varepsilon n_i}$" and insert therefor --$2^{\varepsilon n_j}$--.

Col. 3, line 50 delete the expression "$2^{\varepsilon n_i}$" and insert therefor --$2^{\varepsilon n_j}$--.

Claim 1, col. 19, line 8, delete the expression "$2^{\varepsilon n_i}$" and insert therefor --$2^{\varepsilon n_j}$--.

Claim 1, col. 19, line 13, delete the expression "$2^{\varepsilon n_i}$" and insert therefor --$2^{\varepsilon n_j}$--.

Claim 1, col. 19, line 27, delete "weighting" and insert therefor --weighing--.

Claim 1, col. 19, line 38, after "list" delete the period "." and insert a comma --,--.

Claim 2, col. 19, line 57, delete the expression "$2^{\varepsilon n_i}$" and insert therefor --$2^{\varepsilon n_j}$--.

Claim 2, col. 19, line 61, delete the expression "$2^{\varepsilon n_i}$" and insert therefor --$2^{\varepsilon n_j}$--.

Claim 3, col. 20, line 45, delete the expression "$2^{\varepsilon n_i}$" and insert therefor --$2^{\varepsilon n_j}$--.

Claim 3, col. 20, line 49, delete the expression "$2^{\varepsilon n_i}$" and insert therefor --$2^{\varepsilon n_j}$--.

Claim 4, col. 22, line 42, delete "said".

UNITED STATES PATENT AND TRADEMARK OFFICE
CERTIFICATE OF CORRECTION

PATENT NO.  : 5,049,986
DATED       : September 17, 1991
INVENTOR(S) : M. Aono, et al It is certified that error appears in the above-identified patent and that said Letters Patent is hereby corrected as shown below:

Claim 3, col. 20, line 46, delete the expression "$2\varepsilon ni$" and insert therefor --$2\varepsilon ni$--.

Signed and Sealed this

Fourth Day of May, 1993

Attest:

MICHAEL K. KIRK

Attesting Officer

Acting Commissioner of Patents and Trademarks